United States Patent
Viswanathan et al.

(10) Patent No.: US 12,456,019 B2
(45) Date of Patent: Oct. 28, 2025

(54) RESPONSE GENERATION FROM MULTI-INTENT INPUT

(71) Applicant: Bank of America Corporation, Charlotte, NC (US)

(72) Inventors: Krithika Viswanathan, Chennai (IN); Amit Mishra, Chennai (IN); Pravin Kumar Sankari Bhagavathiappan, Kanyakumari District (IN); Niharika Marisetti, West Godavari (IN)

(73) Assignee: Bank of America Corporation, Charlotte, NC (US)

( * ) Notice: Subject to any disclaimer, the term of this patent is extended or adjusted under 35 U.S.C. 154(b) by 258 days.

(21) Appl. No.: 18/332,005

(22) Filed: Jun. 9, 2023

(65) Prior Publication Data
US 2024/0412005 A1  Dec. 12, 2024

(51) Int. Cl.
*G06F 40/205* (2020.01)
*G06F 40/157* (2020.01)
*G06F 40/284* (2020.01)
*G06F 40/40* (2020.01)
*G10L 15/22* (2006.01)

(52) U.S. Cl.
CPC ............ *G06F 40/40* (2020.01); *G06F 40/157* (2020.01); *G06F 40/205* (2020.01); *G06F 40/284* (2020.01)

(58) Field of Classification Search
CPC ................................ G10L 15/18; G10L 15/22
See application file for complete search history.

(56) References Cited

U.S. PATENT DOCUMENTS

| | | |
|---|---|---|
| 10,922,491 B2 | 2/2021 | Renard |
| 11,042,800 B2 | 6/2021 | Mars et al. |
| 11,080,023 B2 | 8/2021 | Bodin et al. |
| 11,206,229 B2 | 12/2021 | Singaraju et al. |
| 11,455,494 B2 | 9/2022 | Galitsky |
| 11,562,267 B2 | 1/2023 | Polleri et al. |
| 11,584,020 B2 | 2/2023 | Huang et al. |
| 2015/0348551 A1* | 12/2015 | Gruber ............... G10L 15/1822 704/235 |
| 2017/0242886 A1 | 8/2017 | Jolley et al. |
| 2017/0242899 A1 | 8/2017 | Jolley et al. |
| 2017/0243107 A1 | 8/2017 | Jolley et al. |
| 2018/0329880 A1 | 11/2018 | Galitsky |

(Continued)

OTHER PUBLICATIONS

Viswanathan, Krithika, "Utterance building to convey user input to conversational agents," U.S. Appl. No. 18/332,013, filed Jun. 9, 2023 (64 pages).

*Primary Examiner* — Jialong He

(57) ABSTRACT

A system receives an input from a user, where the input indicates a request to perform one or more tasks. The system generates a plurality of utterances from the input. Each utterance indicates a different operation. The system determines a sequence of the operations to be performed in order to perform the one or more tasks. The system identifies a conversational software algorithm that is configured to process a respective utterance based on the topic of the utterance. The system communicates each utterance to the respective conversational software algorithm. The system receives responses from the conversational software algorithms. The system determines whether each response is valid. The system generates a final response based on the valid responses. The system outputs the final response.

20 Claims, 5 Drawing Sheets

(56) References Cited

U.S. PATENT DOCUMENTS

| | | | |
|---|---|---|---|
| 2018/0357220 A1 | 12/2018 | Galitsky | |
| 2018/0357221 A1 | 12/2018 | Galitsky | |
| 2019/0012390 A1 | 1/2019 | Nishant et al. | |
| 2019/0138595 A1 | 5/2019 | Galitsky | |
| 2019/0164540 A1* | 5/2019 | Park | G06F 40/284 |
| 2020/0193265 A1 | 6/2020 | Hill et al. | |
| 2020/0210649 A1* | 7/2020 | Lewis | G06F 40/35 |
| 2020/0257857 A1 | 8/2020 | Peper et al. | |
| 2020/0342873 A1* | 10/2020 | Teserra | G06F 40/295 |
| 2021/0081837 A1 | 3/2021 | Polleri et al. | |
| 2021/0081848 A1 | 3/2021 | Polleri et al. | |
| 2021/0165969 A1 | 6/2021 | Galitsky | |
| 2022/0006761 A1 | 1/2022 | Magliozzi et al. | |
| 2023/0032575 A1* | 2/2023 | Erbas | G10L 15/02 |
| 2024/0414106 A1* | 12/2024 | Swaminathan | G06F 8/658 |

* cited by examiner

RESPONSE GENERATION FROM MULTI-INTENT INPUT

TECHNICAL FIELD

The present disclosure relates generally to the translation of input in human-machine conversation, and more specifically to response generation from multi-intent input.

BACKGROUND

Conversational software algorithms (e.g., "chatbots") are used to understand user inputs and converse with users. In some cases, user input may be complex. For example, the user may indicate multiple intents, topics, or requests in an input to the conversational software algorithm. Each request may require a different sequence of operations to be performed to satisfy the request. Digesting such complex inputs and addressing each of the requests is challenging.

SUMMARY

The system described in the present disclosure is particularly integrated into practical applications of improving the translation of user input in the human-machine conversation technology. In one example, the disclosed system improves the translation of user input in the human-machine conversation techniques by splitting the user input which includes multiple topics into a plurality of portions, where each of the portions is directed to a single topic. In this way, each portion can be processed and addressed individually. Thus, no topic of the user input is ignored or undermined which is one of the problems in the current human-machine conversation techniques. In another example, the disclosed system improves the human-machine conversation technology by increasing the accuracy of responses of the machine to the user. The disclosed system increases the accuracy of responses by translating each split portion of the user input into a respective utterance that explains the respective split portion of the user input to a conversational software algorithm. For example, if user input is "send file 1 to John." The disclosed system splits the user input into "send file 1" and "to John." These split portions may not convey a user intent. In this example, the disclosed system may translate the "send file 1" into "find file 1 from the memory disk and if it is found send it." Similarly, the disclosed system may translate the "to John" into "find the contact information of John from my contact list." The disclosed system may feed each translated portion to a different conversational software algorithm that is pre-configured to perform operations related to a topic of the given portion. For example, the disclosed system may feed the "find file 1 from the memory disk and if it is found send it" to a first conversational software algorithm that is pre-configured to find files based on their titles, and if a file is found communicate it to the indicated receiver. Similarly, the disclosed system may feed the "the disclosed system may feed the "find the contact information of John from my contact list" to a second conversational software algorithm that is pre-configured to find contact information based on their names and generate a response with a set of words related to fetching contact information.

In an example situation, a user may include multiple and/or complex requests in an input and requires a server to provide a response to those requests and perform operations to satisfy the user requests. In such cases, the input may include multiple entities and intents. Digesting such complex inputs and addressing each of the requests is challenging. One approach to processing complex inputs is to implement a single conversation agent to digest a complex input. However, this approach suffers from several drawbacks. In one example, as the length of the input increases, the latter words (or sentences) in the input are ignored and/or given less weight compared to the earlier words (or sentences) by current conversational agents. Therefore, the requests and generally information that are in the latter portions of the complex input are not accurately processed. This leads to those requests in the latter portion of the complex input not being addressed or satisfied. In another example, a complex input may be short in length (e.g., less than ten words), however, information requested in the input may be compactly conveyed or summarized. The current conversational agents do not understand the meaning of compact (or summarized) sentences that includes several intents, requests, and/or topics. This may be due to the current method of training the conversation agents with sentences that only have one intent, request, or topic. As such, the current human-machine conversational agents are not configured to extract each intent, request, and topic (collectively referred to herein as "topic") from the complex inputs and provide a comprehensive and accurate response to the input.

Certain embodiments of the disclosed system are configured to provide a solution to this and other technical problems arising in the realm of human-machine conversation technology. The present disclosure contemplates an unconventional system and method for processing input that includes multiple topics, provides a response that addresses the intents, requests, and topics, and performs the operations inferred from the input. For example, the disclosed system contemplates splitting the input into logical portions where each portion indicates or is associated with a single topic, intent, and/or request. In response, for each split portion of the input, the disclosed system generates an utterance that explains a respective split portion, such that the generated utterance conveys the user's intent in the split portion to a respective conversational software algorithm.

Certain embodiments of the disclosed system provide technical advantages and practical applications that one of ordinary skill in the art would recognize. For example, the disclosed system obviates the need for follow-up human-machine conversations about an initial input that includes multiple requests. For example, by identifying each request from the input on a first interaction and addressing each of the requests, the user would not have a follow-up question or input for the machine. Therefore, the follow-up human-machine conversations are reduced or eliminated. This, in turn, provides an additional practical application of reducing network traffic and network congestion at the computer systems used in communicating the input of the human to the machine and responses of the machine to the human.

In certain embodiments, the disclosed system is configured to provide an additional practical application of improving the accuracy of the responses. For example, when a conversational software algorithm provides a response that is related to one topic from the topics in a provided input, the response is evaluated, e.g., against a set of reference responses that are related to the topic. If the response corresponds to at least one of the set of reference responses, the disclosed system determines that the response is valid. Otherwise, the system may determine that the response is invalid. Some examples of invalid responses may include "Please try again later," "Sorry cannot process the request," and the like. In some examples, the invalid responses may not be related to the topic or be incomplete. In response to identifying an invalid response, the disclosed system is configured to identify an alternative (or fallback) conversational software algorithm to generate a response for the topic indicated in the input. The disclosed system uses the determination of valid and invalid responses as feedback to identify conversational software algorithms that produce valid responses to prepare responses for further inputs. In this manner, the disclosed system performs conversational software algorithm identification correction.

In certain embodiments, the disclosed system is configured to determine a sequence of operations that need to be performed in order to fulfill the requests indicated in the input. For example, the user may indicate "Please send my document 1 to my address. Note that my new address is as below." in the input. In this example, the user indicates to send the document 1 to the address before indicating that the address is changed to the new address. In certain embodiments, the disclosed system is configured to determine that the second request of the user in the second sentence needs to be performed before the first request indicated in the first sentence even though the first sentence is before the second sentence. Therefore, in such examples, in certain embodiments system reorders the operations that need to be performed to fulfill the requests of the user. In this manner, the disclosed system performs sequence correction.

In certain embodiments, the disclosed system is configured to update or revise a generated utterance that was used to produce a response. In this process, the disclosed system receives feedback from the user, where the feedback indicates whether the response is accurate (e.g., does not address the request of the user) and whether the request of the user is performed. If the feedback indicates that the response is not accurate or the request of the user is not performed, the disclosed system identifies which conversation software algorithm is responsible for the inaccuracy in the response. The disclosed system may generate a new utterance that conveys the intent of the user to a respective conversational software algorithm. In this manner, the disclosed system performs utterance correction.

Response Generation from Multi-Intent Input

In some embodiments, a system for generating a response from a multi-topic input comprises a processor operably coupled with a memory. The memory is configured to store a table of conversational software algorithms and a plurality of topics. The table comprises a first entry that indicates that a first conversational software algorithm is associated with a first topic and a second entry that indicates that a second conversational software algorithm is associated with a second topic. The processor is configured to receive input from a user, wherein the input indicates a request to perform one or more tasks. The processor is further configured to generate a plurality of utterances from the input. The plurality of utterances comprises a first utterance and a second utterance. The first utterance indicates a first operation. The second utterance indicates a second operation. The first operation and the second operation are to be performed in order to perform the one or more tasks. The processor is further configured to determine a sequence of the first operation and the second operation to be performed in order to perform the one or more tasks. The processor is further configured to identify, based at least in part upon the table, the first conversational software algorithm that is associated with the first utterance, where the first conversational software algorithm is configured to process the first utterance. The processor is further configured to identify, based at least in part upon the table, the second conversational software algorithm that is associated with the second utterance, wherein the second conversational software algorithm is configured to process the second utterance. The processor is further configured to communicate the first utterance to the first conversational software algorithm. The processor is further configured to receive a first response from the first conversational software algorithm in response to communicating the first utterance to the first conversational software algorithm. The processor is further configured to communicate the second utterance to the second conversational software algorithm. The processor is further configured to receive a second response from the second conversational software algorithm in response to communicating the second utterance to the second conversational software algorithm. The processor is further configured to determine whether each of the first response and the second response is valid. The processor is further configured, in response to determining that each of the first response and the second response is valid, to generate a final response based at least in part upon the first response and the second response. The processor is further configured to output the final response to the user.

Utterance Building to Convey User Input to Conversational Agents

In some embodiments, a system for utterance building to convey user input to conversational software algorithms comprises a processor operably coupled with a database and a memory. The database comprises a set of data blocks configured to store a set of historical conversations between users and a conversation orchestrator. Each data block from among the set of data blocks is configured to store one of the set of historical conversations. User input in a historical conversation is split into a first set of utterances, wherein each of the first set of utterances is directed to a different operation. The memory is configured to store a workflow associated with a first task. The processor is further configured to extract a first set of entities from the historical conversation, wherein the first set of entities comprises the first task and a first data object associated with the first task. The processor is further configured to access input from a user, wherein the input is associated with a second task. The processor is further configured to extract a second set of entities from the input, wherein the second set of entities comprises the second task and a second data object associated with the second task. The processor is further configured to compare each entity from among the first set of entity with a counterpart entity from among the second set of entities. The processor is further configured to determine that at least a threshold number of second set of entities correspond to counterpart entities from among the first set of entities. In response to determining that at least the threshold number of second set of entities correspond to counterpart entities from among the first set of entities, the processor is further configured to split the input into a second set of utterances according to the first set of utterances. The processor is further configured to generate a third set of utterances. The third set of utterances comprises a first utterance and a second utterance. The first utterance is associated with a first operation. The second utterance is associated with a second operation. The first operation and the second operation are to be performed in order to perform the second task. The processor is further configured to determine that a sequence of the first operation and the second operation corresponds to the workflow for performing the first task. The processor is further configured to perform the first operation and the second operation according to the determined sequence.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to generate a response for a multi-intent input and generate utterances to convey user input to conversational software algorithms. Embodiments of the present disclosure and its advantages may be understood by referring to FIGS. 1 through 5. FIGS. 1 through 5 are used to describe systems and methods that generate a response for a multi-intent input and generate utterances to convey user input to conversational software algorithms according to certain embodiments.

System Overview

Figure 1:
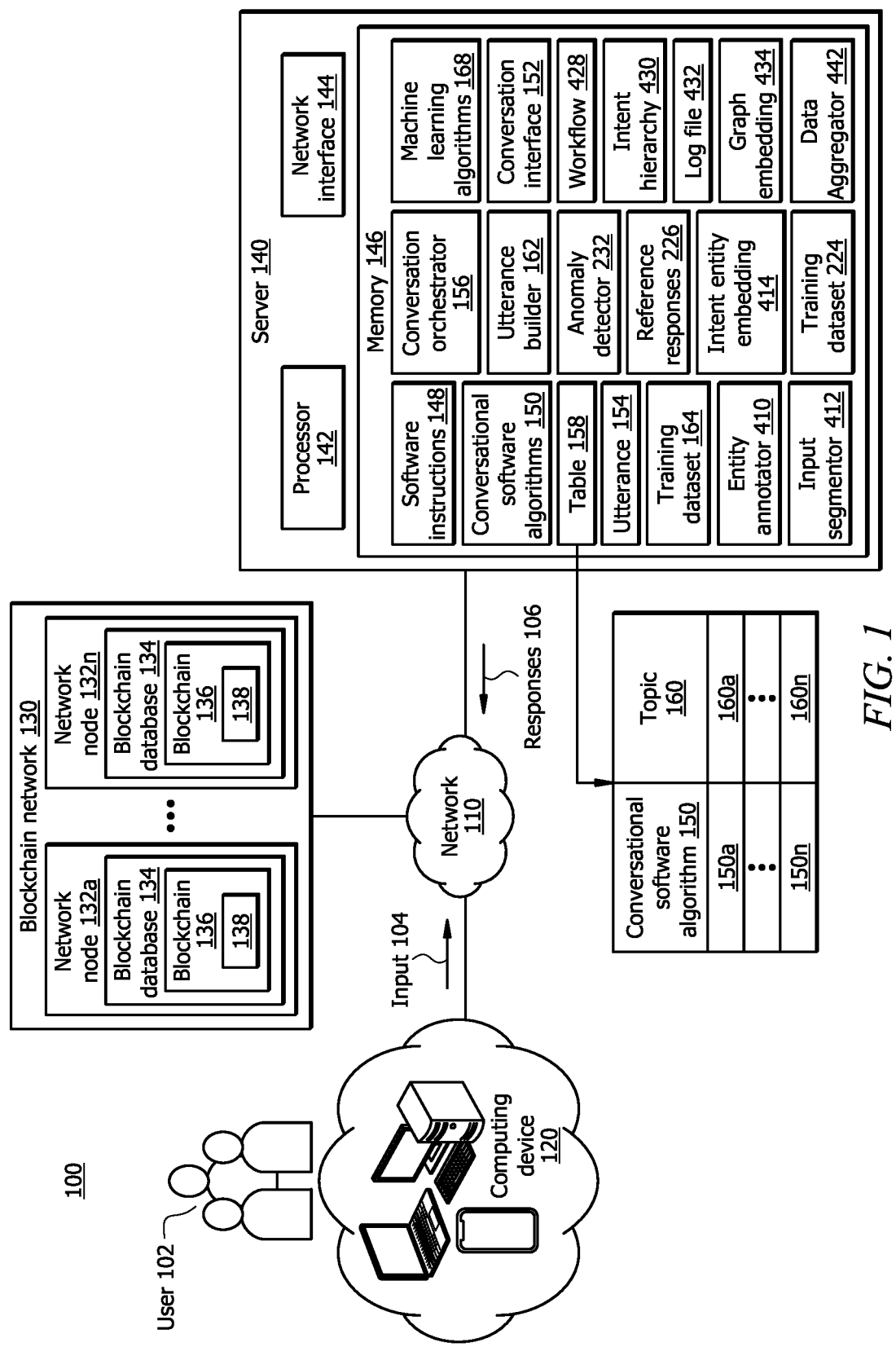
FIG. 1 illustrates an embodiment of a system configured to generate a response for a multi-intent input and generate utterances to convey user input to conversational software algorithms.

FIG. 1 illustrates an embodiment of a system 100 that is generally configured to analyze multi-intent and/or multi-topic user input 104, and generate a response 106 to the input 104 based on scraping and consolidating multiple responses generated by multiple conversational software algorithms 150, and generate utterances 154 to convey user input 104 to conversational software algorithms 150. In certain embodiments, the system 100 comprises one or more computing devices 120, a blockchain network 130, and a server 140 communicatively coupled with each other via a network 110. Network 110 enables communications among the components of the system 100. The user 102 may provide an input 104 to the server 140 via the computing device 120 and network 110. The blockchain network 130 is generally a distributed database that is configured to store historical conversations between the user 102 and the conversation orchestrator 156 via a conversation interface 152. The server 140 comprises a processor 142 in signal communication with a memory 146. Memory 146 stores software instructions 148 that when executed by the processor 142 cause the processor 142 to perform one or more operations of the server 140 described herein. In other embodiments, system 100 may not have all of the components listed and/or may have other elements instead of, or in addition to, those listed above.

In general, the system 100 improves the translation of user input in the human-machine conversation techniques. In one example, the system 100 improves the translation of user input in the human-machine conversation techniques by splitting the user input which includes multiple topics into a plurality of portions, where each of the portions is directed to a single topic. In this way, each portion can be processed and addressed individually. Thus, no topic of the user input is ignored or undermined which is one of the problems in the current human-machine conversation techniques. In another example, the system 100 improves the human-machine conversation technology by increasing the accuracy of responses of the machine to the human. The system 100 increases the accuracy of responses by translating each split portion of the user input into a respective utterance that explains the respective split portion of the user input to a conversational software algorithm. For example, if user input is "send file 1 to John." The system 100 splits the user input into "send file 1" and "to John." These split portions may not convey a user intent. In this example, the system 100 may translate the "send file 1" into "find file 1 from the memory disk and if it is found send it." Similarly, the system 100 may translate the "to John" into "find the contact information of John from my contact list." The system 100 may feed each translated portion to a different conversational software algorithm that is pre-configured to perform operations related to a topic of the given portion. For example, the system 100 may feed the "find file 1 from the memory disk and if it is found send it" to a first conversational software algorithm that is pre-configured to find files based on their titles and if a file is found communicate it to the indicated receiver. Similarly, the system 100 may feed the "the system 100 may feed the "find the contact information of John from my contact list" to a second conversational software algorithm that is pre-configured to find contact information based on their names and generate a response with a set of words related to fetching contact information.

In an example situation, a user 102 may include multiple and/or complex requests in input 104 and requires the server 140 to provide a response to those requests and perform operations to satisfy the requests. In such cases, the input 104 may include multiple entities and intents. Digesting such complex inputs 104 and addressing each of the requests is challenging. One approach to processing complex inputs is to implement a single conversation agent to digest a complex input 104. However, this approach suffers from several drawbacks. In one example, as the length of the input 104 increases, the latter words (or sentences) in the input 104 are ignored and/or given less weight compared to the earlier words (or sentences) by current conversational agents. Therefore, the requests and generally information that are in the latter portion of the complex input 104 are not accurately processed. This leads to those requests in the latter portion of the complex input 104 not being addressed or satisfied. In another example, a complex input 104 may be short in length (e.g., less than ten words), however, information requested in the input 104 may be compactly conveyed or indicated. The current conversational agents do not understand the meaning of compact (or summarized) sentences that includes several intents, requests, and/or topics. This may be due to the current method of training the conversation agents with sentences that only have one intent, request, or topic. As such, the current human-machine conversational agents are not configured to extract each intent, request, and topic (collectively referred to herein as "topic") from the complex inputs 104 and provide a comprehensive and accurate response 106 to the input 104.

Certain embodiments of the system 100 are configured to provide a solution to this and other technical problems arising in the realm of human-machine conversation technology. The present disclosure contemplates an unconventional system and method for processing input 104 that includes multiple topics, and provides a response 106 that address the intents, requests, and topics, and performs the operations inferred from the input 104. For example, system 100 contemplates splitting the input 104 into logical portions where each portion indicates or is associated with a single topic, intent, and/or request. In response, for each split portion of the input 104, the system 100 generates an utterance that explains a respective split portion, such that the generated utterance conveys the user's intent in the split portion to a respective conversational software algorithm 150.

Each respective conversational software algorithm 150 is configured to process and analyze a particular topic. In other words, each respective conversational software algorithm 150 is an expert in a particular domain. Each respective conversational software algorithm 150 analyzes a received split portion and outputs a respective response. Each response is evaluated. The validated responses are scraped and consolidated to form a final cohesive response 106. Each conversational software algorithm 150 also performs operations to satisfy the respective request inferred from the respective split portion of the input 104. The final response is outputted to the user 102. In this manner, each and every topic, intent, and request in the input 104 is addressed.

Certain embodiments of the system 100 provide technical advantages and practical applications that one of ordinary skill in the art would recognize. For example, the system 100 obviates the need for follow-up human-machine conversations about an initial input 104 that includes multiple requests. For example, by identifying each request from the input 104 on a first interaction and addressing each of the requests, the user 102 would not have a follow-up question or input for the machine. Therefore, the follow-up human-machine conversations are reduced or eliminated. This, in turn, provides an additional practical application of reducing network traffic and network congestion at the computer systems used in communicating the input 104 of the human to the machine and responses 106 of the machine to the human.

In certain embodiments, the system 100 is configured to provide an additional practical application of improving the accuracy of the responses 106. For example, when a conversational software algorithm 150 provides a response that is related to one topic from the topics in a provided input 104, the response is evaluated, e.g., against a set of reference responses that are related to the topic. If the response corresponds to at least one of the set of reference responses, the system 100 determines that the response is valid. Otherwise, the system may determine that the response is invalid. Some examples of invalid responses may include "Please try again later," "Sorry cannot process the request," and the like. In some examples, the invalid responses may not be related to the topic or be incomplete. In response to identifying an invalid response, the system 100 is configured to identify an alternative (or fallback) conversational software algorithm 150 to generate a response for the topic indicated in the input 104. The system 100 uses the determination of valid and invalid responses as feedback to identify conversational software algorithms 150 that produce valid responses to prepare responses 106 for further inputs 104. In this manner, the system 100 performs conversational software algorithm 150 identification correction. Further, in this manner, the system 100 improves the translation of user input in human-machine conversations and improves the accuracy of responses of the machine to the user.

In certain embodiments, the system 100 is configured to determine a sequence of operations that need to be performed in order to fulfill the requests indicated in the input 104. For example, the user 102 may indicate "Please send my document 1 to my address. Note that my new address is as below." in the input 104. In this example, the user 102 indicates to send the document 1 to the address before indicating that the address is changed to the new address. The system 100 is configured to determine that the second request of the user 102 in the second sentence needs to be performed before the first request indicated in the first sentence even though the first sentence is before the second sentence. Therefore, in this example, the system 100 reorders the operations that need to be performed to fulfill the requests of the user 102. In this manner, the system 100 performs sequence correction.

In certain embodiments, the system 100 is configured to update or revise a generated utterance that was used to produce a response 106. In this process, the system 100 receives feedback from the user 102, where the feedback indicates whether the response 106 is accurate (e.g., does not address the request of the user 102) and whether the request of the user 102 is performed. If the feedback indicates that the response 106 is not accurate or the request of the user 102 is not performed, the system 100 identifies which conversation software algorithm 150 is responsible for the inaccuracy or anomaly in the response 106. The system 100 may reduce the score of the identified conversational software algorithm 150 regarding the producing valid response regarding a given topic 160 of the input utterance 154. The system may generate a new utterance that conveys the intent of the user 102 to a respective conversational software algorithm 150. In this manner, the system 100 performs utterance correction.

System Components
Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users. Examples of the computing device 120 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. For example, the computing device 120 may communicate inputs 104 to the server 140 via the network 110 in response to a command from the user, e.g., when the user initiates the transmission of the inputs 104. For example, the inputs 104 may be in forms of text, voice, emails, phone calls, online comments on the website associated with an organization associated with the server 140, and online conversations with a conversation agent/software algorithm via a conversation interface 152, among others.

Blockchain Network

Blockchain network 130 is a peer-to-peer network of network nodes, and is generally configured to distribute historical conversation data 138 (and any other data/information) among the network nodes 132*a-n*. In certain embodiments, the blockchain network 130 is a distributed database in a network of network nodes 132*a-n*. In certain embodiments, blockchain network 130 may be a public blockchain network. In certain embodiments, blockchain network 130 may be a private blockchain network. For example, membership in blockchain network 130 may be limited to nodes registered as belonging to and/or affiliated with the organization to which the server 140 belongs. In certain embodiments, the server 140 may be a member of blockchain network 130 (e.g., as nodes among nodes 132*a-n* in blockchain network 130).

The blockchain network 130 may comprise any number of network nodes 132*a-n* to form a distributed network that maintains a blockchain 136. Each network node 132 may comprise a computing device, a virtual machine, a server, a workstation, and/or the like. Each network node 132*a* through 132*n* of blockchain network 130 stores a blockchain database 134 that is configured to store a copy of a blockchain 136. Each network node 132*a* through 132*n* may be an instance of a network node 132. The network node 132 may include a hardware processor, memory, and/or circuitry (not explicitly shown) configured to perform any of the functions or actions of the network node 132 described herein. For example, a software application designed using software code may be stored in the memory and executed by the processor to perform the functions of the network node 132. The network node 132 is configured to communicate with other devices and components of the system 100 via the network 110.

In certain embodiments, the server 140 may access the blockchain network 130 via the network 110 to distribute information in the blockchain network 130, including the historical conversation data 138. The blockchain network 130 may be configured to distribute historical conversation data 138 among the nodes 132*a-n*. The server 140 may use an application programming interface (API) service via the network 110 to access the blockchain network 130.

The blockchain network 130 is configured to establish consensus among the network nodes 132*a-n* about the present state of the blockchain database 134. For example, each network node 132*a-n* comprises a processor in signal communication with a memory storing software instructions that when executed by the processor, cause the network nodes 132*a-n* to implement a consensus protocol procedure through which all the network nodes 132*a-n* of the blockchain network 130 reach a common agreement about the present state of the blockchain database 134. In this way, each network node 132*a-n* achieves dependability in the blockchain network 130 and establishes trust between the network nodes 132*a-n* in a distributed computing environment. Essentially, the consensus protocol makes sure that every new block that is added to the blockchain 136 is the one and only version of the truth that is agreed upon by all the block in the blockchain 136. Blockchain 136 links together blocks of data, which store identifiable units called blockchain data entries. The blockchain data entry may be interchangeably referred to herein as a blockchain data entry. The blockchain data entries stored in the blockchain 136, may include information, files, and/or any other suitable type of data. For example, blockchain data entries may include historical conversation data 138 received from the server 140. Each historical conversation data 138 may be associated with a different interaction session. The historical conversation data 138 may include information about a sending entity (e.g., the computing device 120 or another device), information about a receiving entity (e.g., the computing device 120 or another device), authentication token, data transferred (e.g., software and/or hardware services), a timestamp of each data transfer, and/or any other information, for example. With every new data transfer (e.g., every new interaction session), a new block of data may be generated and added to the blockchain 136. For example, with each conversation between the user 102 and the conversational software algorithms 150, a new block is generated and the conversation is recorded in the new block in the blockchain 136.

Server

Server 140 generally includes a hardware computer system configured to analyze complex and/or multi-intent and/or multi-topic input 104, perform operations to satisfy the requests indicated in the input 104, and provide a response 106 to the input 104. In certain embodiments, the server 140 may be implemented by a cluster of computing devices, such as virtual machines. For example, the server 140 may be implemented by a plurality of computing devices using distributed computing and/or cloud computing systems in a network. In certain embodiments, the server 140 may be configured to provide services and resources (e.g., data and/or hardware resources, such as the responses 106, etc.) to other components and devices.

The server 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAS, ASICs, DSPs, or any other suitable hardware. The processor 142 is configured to operate as described in FIGS. 1-5. For example, the processor 142 may be configured to perform one or more operations of the operational flow 200 as described in FIG. 2, one or more operations of the method 300 as described in FIG. 3, one or more operations of operational flow 400 as described in FIG. 4, and one or more operations of method 500 as described in FIG. 5.

Network interface 144 is configured to enable wired and/or wireless communications. The network interface 144 may be configured to communicate data between the server 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, a cloud database, a network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, conversational software algorithms 150, table 158, utterances 154, conversation orchestrator 156, utterance builder 162, anomaly detector 232, reference responses 226, machine learning algorithm 168, conversation interface 152, training dataset 224, training dataset 164, entity annotator 410, input segmentor 412, intent entity embedding 414, graph embedding 434, data aggregator 442, workflows 428, intent hierarchy 430, log file 432, and/or any other data or instructions. The software instructions 148 may comprise any suitable set of instructions, logic, rules, or code operable to execute the processor 142 and perform the functions described herein, such as some or all of those described in FIGS. 1-5.

Each conversation software algorithm 150 may be executed by the processor 142 executing software instructions 148, and is generally configured to process an input 104, perform operations 220 to satisfy requests inferred from or indicated in the input 104, and provide a response 222. In certain embodiments, the conversation software algorithm 150 may include a support vector machine, neural network, random forest, k-means clustering, Tree-based algorithm, Random Forest algorithm, etc. In certain embodiments, the conversation software algorithm 150 may include natural language processing, audio signal processing, and the like. In certain embodiments, the conversation software algorithm 150 may perform word segmentation, sentence segmentation, word tokenization, sentence tokenization, sentiment analysis, and/or the like in processing each utterance 154 to detect the words in each utterance 154, the location of each word with respect other words in a sentence (e.g., utterance 154), sentiment, meaning, context, topic, intent, and other information about each utterance 154. The conversation software algorithm 150 provides output to the conversation orchestrator 156 for further processing (see FIG. 2). Each conversation software algorithm 150 may be pre-trained (e.g., pre-configured) to process a particular domain (e.g., topic), such as a user profile domain, database lookup domain, web application domain, mobile application domain, user communication domain, and the like. In other words, each conversation software algorithm 150 is configured with a set of words or lexicon related to a particular domain to be an expert in that domain.

Table 158 comprises a map indicating to which topic 160 a respective conversational software algorithm 150 is associated. Table 158 includes a first entry that indicates a first conversational software algorithm 150a is associated with a first topic 160a, and a second conversational software algorithm 150n is associated with a second topic 160n. The table 158 may include any number of conversational software algorithms 150a-n mapped to various topics 160a-n. For example, a topic 160a-n may include user profiles, interactions between users, interactions between a user and the server 140, web application topic, mobile application topic, user communication domain, accounting, customer service, and the like.

Conversation orchestrator 156 may be implemented by the processor 142 executing the software instructions 148, and is generally configured to 1) split the input 104 into logical portions (e.g., utterances 440 in FIG. 4), where each portion is directed to a single intent, topic, or request (collectively referred to herein as "topic"); 2) determine a sequence (logical order) of utterances 154 that they need to be addressed in order to satisfy the requests of the user 102; 3) evaluate responses 222 om the conversational software algorithms 150; 4) collate the responses 222 from the conversational software algorithms 150; and 5) generate a final response 106 based on the responses from the conversational software algorithms 150. These operations of conversation orchestrator 156 are described in greater detail in FIG. 2 in conjunction with the operational flow 200 of system 100.

In certain embodiments, the conversation orchestrator 156 may include a support vector machine, neural network, random forest, k-means clustering. Tree-based algorithm, Random Forest algorithm, etc. In certain embodiments, the conversation orchestrator 156 may include natural language processing, audio signal processing, and the like. In certain embodiments, the conversation orchestrator 156 may perform word segmentation, sentence segmentation, word tokenization, sentence tokenization, sentiment analysis, and/or the like in processing input 104 to detect the words, meaning, sentiment, topic, intent, request, the context of each portion of the input 104, the location of each word with respect other words in input 104, and other information about each input 104. The conversation orchestrator 156 provides a response 106 to the user 102 and to anomaly detector 232 for further processing (see FIG. 2).

Utterance builder 162 may be implemented by the processor 142 executing the software instructions 148, and is generally configured to generate utterances 154 from the input 104. Each generated utterances 154 may explain a respective portion of the input 104 such that a respective conversational software algorithm 150 is able to understand the meaning and the topic 160 of the respective portion of the input 104. These operations of utterance builder 162 are described in greater detail in FIG. 2 in conjunction with the operational flow 200 of system 100. In certain embodiments, the utterance builder 162 may include a support vector machine, neural network, random forest, k-means clustering, Tree-based algorithm, Random Forest algorithm, etc. In certain embodiments, the utterance builder 162 may include natural language processing, audio signal processing, and the like. In certain embodiments, the utterance builder 162 may perform word segmentation, sentence segmentation, word tokenization, sentence tokenization, sentiment analysis, and/or the like to detect the words, meaning, sentiment, topic, intent, request, context of a given input (e.g., input 104, utterances 440, historical conversations 138 (see FIGS. 2 and 4)), the location of each word with respect other words in the given input, and other information about each input. The utterance builder 162 provides output to the conversation orchestrator 156 for further processing (see FIG. 2).

Conversation interface 152 is generally an interface that facilitates communication of input 104 and responses 106 between the user 102 and the server 140. For example, the conversation interface 152 may include a user interface, software instructions to implement the user interface and communications between the user 102 and the server 140. Other components stored in the memory 146 are described in the discussion of FIGS. 2-5.

Operational Flow for Generating a Response to a Multi-Topic Input

Figure 2:
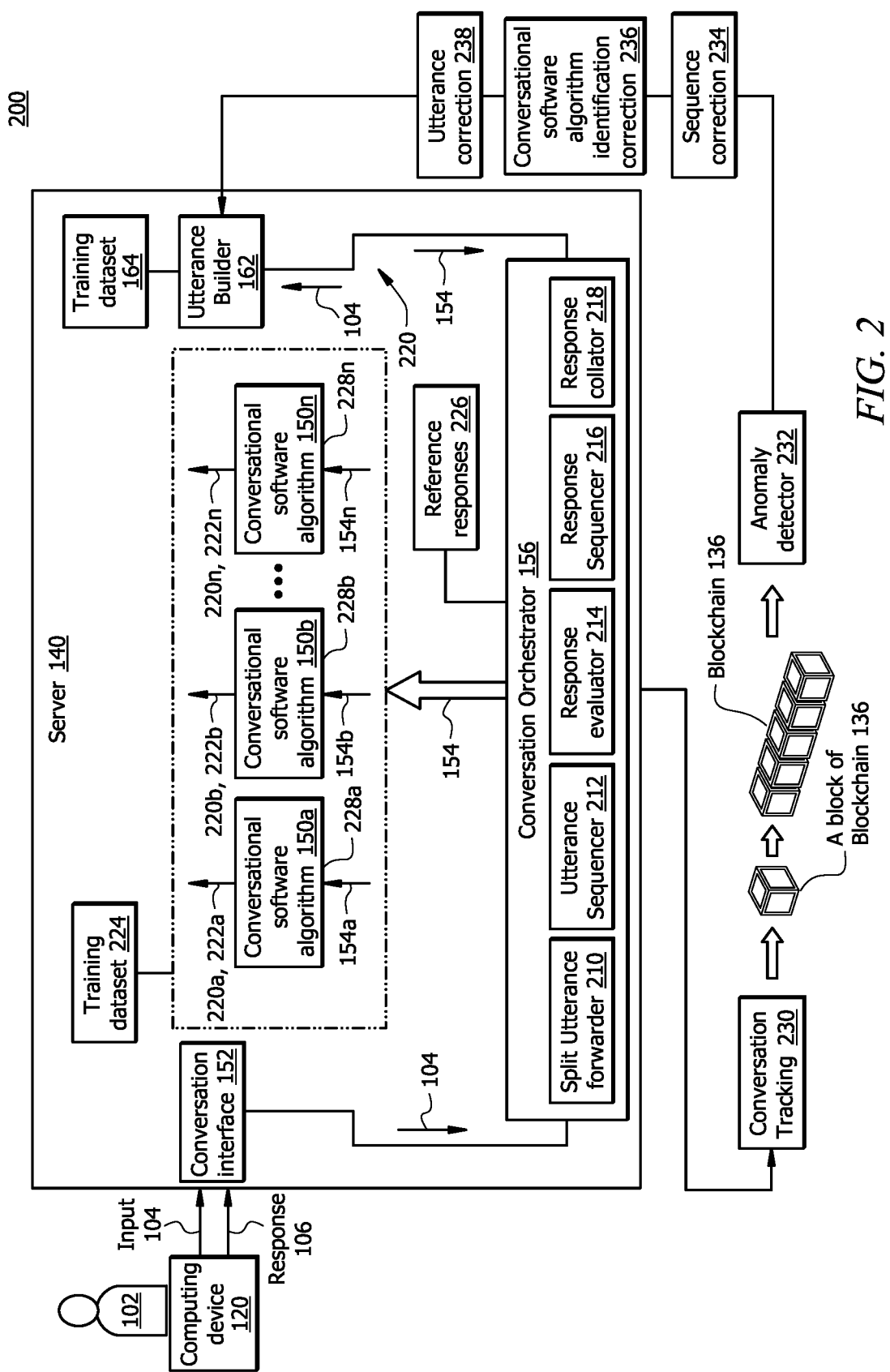
FIG. 2 illustrates an example operational flow of the system of FIG. 1 to generate a response for a multi-intent input.

FIG. 2 illustrates an example operational flow 200 of the system 100 (see FIG. 1) for generating a response 106 to a multi-topic input 104. The operational flow 200 begins when the user 102 provides input 104 to the server 140 via the computing device 120. For example, the user 102 may open a webpage of a website of the organization to which the server 140 belongs. The user 102 may interact with a chat interface on the webpage by entering text or speaking into a microphone operably connected to the computing device 120. The text or speech of the user 102 may be an input 104 of the user 102. The user 102 may indicate more or more requests (e.g., topics) to perform one or more tasks in the input 104.

In operation, the input 104 may be received by the conversation interface 152. The conversation interface 152 communicates the input 104 to the conversation orchestrator 156. The conversation orchestrator 156 includes split utterance forwarder 210, utterance sequencer 212, response evaluator 214, response sequencer 216, and response collator 218. Each of these components may be implemented by the processor 142 executing the respective software instructions 148, and is generally configured to perform one or more operations of the conversation orchestrator 156 described herein.

Generating Utterances from the Input

After receiving the input 104 at the conversation orchestrator 156, the input 104 is forwarded to the utterance builder 162. The utterance builder 162 generates a set of utterances 154 from the input 104. Each of the set of utterances 154 may indicate a different operation. For example, a first utterance 154 may indicate a first operation and the second utterance 154 may indicate a second operation. The set of operations indicated in the set of utterances 154 are to be performed in order to perform the one or more tasks indicated in or inferred from the input 104. For example, assuming that the input 104 is "send a file 1 from my profile to John," the set of utterances 154 generated based on this exemplary input 104 may include "find the file 1 in my profile," "fetch John's contact information from the list of contacts," and "if file 1 is found and if John's contact information is found, send the file 1 to John's contact information." As can be seen from this example, the utterances 154 are not mere split portions of the input 104. Rather, the utterances 154 are logical operations and explanations to elaborate the operations that need to be performed in order to satisfy the requests indicated in or inferred from the input 104. In this process, the input 104 is fed to the machine learning algorithm that is implemented in the utterance builder 162.

The utterance builder 162 may extract a first set of features from the input 104, where the first set of features may indicate the words, sentiment, positions of the words, meaning, context, request, and other information about the input 104. The extracted features may be represented by a first vector. The first vector may be assigned a score in an embedding space (e.g., vector space). The utterance builder 162 may compare the first vector with a training dataset 164 that comprises a set of vectors associated with historical utterances that were previously generated from historical inputs, intent-entity embedding 414, graph embedding 434, workflow 428, intent hierarchy 430, and log files 432. These components are described in FIG. 4. In response to comparing the first vector with the training dataset 164, the utterance builder 162 may determine whether any of historical conversation's score in embedding space is within a threshold distance (e.g., within 0.01, 0.02, etc.) from a score of the first vector in the embedding space. A score of a vector may indicate the position of the vector in the vector space (420 in FIG. 4). If it is determined that the score of the first vector is within the threshold distance from a historical input in a historical conversation 138 between a user and the conversation interface 152, the utterance builder 162 may determine that the utterances 154 may follow a same or similar logic as the utterances that were generated from the historical input. In other words, it may be determined that the input 104 may be split into logical portions in a similar manner as the corresponding historical input in the historical conversation 138.

The utterance builder 162 determines the sequence of operations 220 to be performed in order to perform the tasks indicated in or inferred from the input 104. The utterance builder 162 may determine the sequence of operations 220 based on the training dataset 164. In this operation, the utterance builder 162 may determine that the sequence of the operations 220 may correspond to the sequence of operations of the historical utterances associated with the historical input, the order of operational flow for performing operations to perform the task (indicated in the input 104) as indicated in the workflow 428, the hierarchy of the intents in the input 104 as determined from the intent hierarchy 430, the order by which software applications were called/used to perform the operations of the request as indicated in the log file 432. The operation of generating utterances 154 is described in greater detail in FIG. 4.

Identifying a Conversational Software Algorithm for Each Utterance

The utterance builder 162 may communicate the utterances 154 to the split utterance forwarder 210. The split utterance forwarder 210 may identify a conversational software algorithm 150 for each utterance 154. In other words, the split utterance forwarder 210 assigns each utterance 154 to a conversational software algorithm 150 that is pre-configured to process the respective utterance 154 and understand its meaning, context, topic, and request. In this process, the split utterance forwarder 210 may be provided with the topic 160 of each utterance 154 by the utterance builder 162. The utterance builder 162 determines the topic 160 of each utterance 154 during the operations described above, tags each utterance 154 with a respective topic 160, and provides the utterances 154 along with their respective topics 160 to the split utterance forwarder 210.

The split utterance forwarder 210 access the table 158. The split utterance forwarder 210 determines a conversational software algorithm 150 that is associated with a given topic 160 tagged with a given utterance 154. For example, based on the table 158, the split utterance forwarder 210 may determine that the first conversational software algorithm 150a is associated with the first utterance 154a, the second conversational software algorithm 150b is associated with a second utterance 154b, and a third conversational algorithm 150n is associated with a third utterance 154n. In this example, the first conversational software algorithm 150a may be pre-configured to process the first utterance 154a (e.g., understand the meaning, context, topic, and request of the first utterance 154a), the second conversational software algorithm 150b may be pre-configured to process the second utterance 154b (e.g., understand the meaning, context, topic, and request of the second utterance 154b), and the third conversational software algorithm 150n may be pre-configured process to third the first utterance 154n (e.g., understand the meaning, context, topic, and request of the third utterance 154n). In response, the split utterance forwarder 210 may forward the first utterance 154a to the first conversational software algorithm 150a, forward the second utterance 154b to the second conversational software algorithm 150b, and forward the third utterance 154n to the third conversational software algorithm 150n.

Generating Responses to the Utterances

The first conversational software algorithm 150a may process the first utterance 154a and determine its meaning, context, topic, and request. In this process, the first conversational software algorithm 150a (e.g., implemented with a natural language processing machine learning algorithm) may extract each word from the first utterance 154a, determine their meaning, the position of each word, the sentiment of each word, the sentiment of the first utterance 154a, among other information about the first utterance 154a. The first conversational software algorithm 150a may then implement linguistics analysis to determine the meaning, context, and request of the first utterance 154a. For example, the first conversational software algorithm 150a may feed the utterance 154a to a neural network that is pre-configured (e.g., with a training dataset 224) to extract the meaning, context, topic, and request of the first utterance 154a. The training dataset 224 may include a set of words and/or sentences, each labeled with a respective, meaning, context, topic, and/or request. The extracted meaning, context, topic, and request for the first utterance 154a may be represented in a first vector. The training dataset 224 may include a set of vectors, each representing a meaning, context, topic, and request of a respective word/sentence. The first conversational software algorithm 150a may perform a vector comparison between each vector of the training dataset 224 and the first vector associated with the first utterance 154a. The first conversational software algorithm 150a may determine a Euclidean distance between first vector and each of the vectors of the training dataset. If the first conversational software algorithm 150a determines that the Euclidean distance between the first vector and a second vector of the training dataset 224 is less than a threshold distance (e.g., less than 0.01, 0.02, etc.), the first conversational software algorithm 150a may determine that the meaning, context, topic, and request associated with the second vector corresponds to the meaning, context, request, and request of the first utterance 154a. Similar operations may be performed by other conversational software algorithms 150b-n to determine the meaning, context, topic, and request of respective utterances 154b-n. Each conversational software algorithm 150a-n may perform a respective operation 220a-n determined from the respective utterance 154a-n.

For example, continuing the example utterances 154 above, in case the first utterance 154a is "find the file 1 in my profile," the first conversational software algorithm 150a may find the file 1 from the user's profile (operation 220a). In case, the second utterance 154b is "fetch John's contact information from the list of contacts," the second conversational software algorithm 150b may access the list of contacts on the computing device 120 and fetch John's contact information from the list of contacts (operation 220b). In case, the third utterance 154n is "if file 1 is found and if John's contact information is found, send the file 1 to John's contact information," the third conversational software algorithm 150n may determine if the file 1 is found and if John's contact information is found based on outputs from the first and second conversational software algorithms 150a and b. The conversational software algorithms 150a-n may communicate data (e.g., their input/output) to each other. In response to determining that the file 1 is found and John's contact information is found (from data received from the first and second conversational software algorithm 150a-b), the conversational software algorithm 150n may send the file 1 to John's contact information using a messaging interface (operation 220n).

Each conversational software algorithm 150a-n outputs a respective response 222a-n. The first conversational software algorithm 150a outputs response 222a, the second conversational software algorithm 150b outputs response 222b, and third conversational software algorithm 150n outputs 222n. In some examples, each response 222a-n may indicate that a respective operation 220a-n is preformed and/or if a follow-up input is needed from the user 102. In some examples, the response 222a-n may include a request for follow-up input. In some examples, each response 222a-n may include any other information and/or instruction. The responses 222a-n may be communicated to the conversation orchestrator 156.

In some embodiments, identifying that the first conversational software algorithm 150a is associated with the first utterance 154a comprises determining a first context of the first utterance 154a, determining that the first context of the first utterance 154a is related to the first topic 160a, and determining that the first conversational software algorithm 150a is associated with the first utterance 154a in response to determining that the first context of the first utterance 154a and the first conversational software algorithm 150a are associated with the first topic 160a based on the table 158. Similar operations may be performed for other utterances 154a-n. In some embodiments, one or more utterances 154a-n may be implicitly implied in the input 104. In some embodiment, one or more utterances 154a-n may be explicitly implied in the input 104.

Determining the Sequence of Utterances

The utterance sequencer 212 may determine the sequence by which the utterances 154a-n and/or the operations 220a-n need to be performed in order to satisfy the requests inferred from the input 104. For example, assume that the utterance 154a includes "send my file 1 to my address" and utterance 154b includes "my new address is xyz." In this example, the utterance sequencer 212 may determine that the utterance 154b needs to be addressed before utterance 154a because the file 1 is needed to be sent to the new address. In response, the utterance sequencer 212 may reorder the utterances 154a-b so that the utterance 154b is addressed first and operation 220b is performed before operation 220a. In a similar manner, the responses 222a-n may be according to the reordered utterances 154a-b so that responses 222 with a higher priority are presented to the user before other responses 222.

Evaluating Conversational Software Algorithm Responses

The response evaluator 214 may evaluate each of the responses 222a-n. In this operation, the response evaluator 214 may compare each response 222a-n with a set of reference responses 226 that include expected responses and previously validated responses. The response evaluator 214 may determine that a response 222a-n is valid if it corresponds to any of the reference responses 226. Otherwise, the response evaluator 214 may determine that a response 222 is invalid. Some examples of invalid responses 222a-n may include "Please try again later," "Sorry cannot process the request," and the like. In some examples, the invalid responses 222a-n may not be related to the topic or be incomplete. If it is determined that a response 222 is valid, the response 222 is forwarded to response collator 218. Otherwise, in some embodiments, an alternative conversational software algorithm 150 may be assigned to process the respective utterance 154.

The server 140 may determine a score 228a-n for each conversational software algorithm 150a-n. The score 228a-n may indicate a confidence level of a respective conversational software algorithm 150a-n to be able to process an utterance 154 related to a topic 160 and generate a valid response 222a-n. In some cases, multiple conversational software algorithms 150a-n may be configured to process an utterance 154 related to a topic 160 and generate a valid response 222a-n. The initial conversational software algorithm 150 that was selected to process the utterance 154, may have a top score 228 to process the utterance 154 and produce a valid response 222. The alternative conversational software algorithm 150 may have a next top score 228 to process the utterance 154 and product a valid response 222 compared to the initial conversational software algorithm 150 that was selected to process the utterance 154. For example, the alternative conversational software algorithm 150 may be selected if the initially selected conversational software algorithm 150 is down, has a malfunction, and/or the response 222 is invalid. For example, the server 140 (e.g., via the response evaluator 214) may determine that the response 222a is invalid. In response, the server 140 may identify a third conversational software algorithm 150n that is a fallback for the first conversational software algorithm 150a, communicate the first utterance 154a to the third conversational software algorithm 150n, and receive a response 222n from the third conversational software algorithm 150n. In each iteration of receiving a response 222, the response 222 may be evaluated similarly to that described above. A final response 106 may be formed based on the valid responses 222a-n.

Response Sequencer

The valid responses 222a-n are sent to the response sequencer 216. The response sequencer 216 determines the sequence of responses 222a-n in the order they need to be presented to the user 102 and added to the final response 106. The response sequencer 216 determines whether a response 222a-n requires an input from the user 102. If the response sequencer 216 determines that a first response 222a requires a follow-up input from the user 102, the response sequencer 216 may prioritize the response 222a over other responses 222b-n, such that the response 222a is presented prior to other responses 222b-n in a final response 106. Otherwise, the response 222 that does not require a follow-up input from the user 102 is sent to the response collator 218 in an order of the determined priorities. The responses 222 are tagged with respective priorities and sent to the response collator 218.

Collating Response

The valid ordered responses 222a-n are sent to the response collator 218. The response collator 218 may form the final response 106 based on the valid ordered responses 222a-n. In this process, the response collator 218 may scrape the responses 222a-n and consolidate the responses 222a-n such that the final response 106 is cohesive and seamless. The response collator 218 may form the final response 106 based on the priorities of the responses 222a-n, such that responses 222 with higher priority levels are presented before other responses 222. The response collator 218 may scrape, combine, append, and reword (or revise) the responses 222 so that the final response 106 is cohesive and seamless. The server 140 may output the response 106 to the user 102.

Following the use case described above regarding requiring a follow-up input, in response to determining that the follow-up input from the user 102 is needed, the server 140 may receive the follow-up input and feed it to the conversation orchestrator 156 and utterance builder 162 similar to that described above.

The server 140 (e.g., via the utterance builder 162) may generate a new utterance 154 based on the follow-up input, determine a context and topic 160 of the new utterance 154, identify a conversational software algorithm 150 that is associated with new utterance 154 and can process and understand the utterance 154 and perform the respective operation 220 based on the context and topic 160 of the new utterance 154 and the table 158, where the table 158 includes an entry that indicates the conversational software algorithm 150 is associated with the topic 160 of the new utterance 154, where the context of the new utterance 154 is associated with the topic 160 of the new utterance 154. The server 140 (e.g., via the conversation orchestrator 156) communicates the new utterance 154 to the identified conversational software algorithm 150, receives a new response 222 from the identified conversational software algorithm 150, and determines if the new response 222 is valid by comparing with the reference responses 226. If it is determined that the new response 222 is valid, the server 140 generates a second final response 106 based at least on the new response 222 along with other valid responses 222. The server 140 may output the response 106 to the user 102.

In certain embodiments, the server 140 may change the format of the input 104 to another format that the conversational software algorithms 150 and utterance builder 162 can process and understand. For example, the server 140 may change the input 104 from text format into binary, code, and the like.

Detecting and Addressing Anomalies

The input 104 and response 106 in each interaction are saved in a block of a blockchain 136. In a conversation tracking process 230, the server 140 tracks the conversation that comprises the input 104 and responses 106. In this process, the server 140 may replay the conversations to evaluate the responses 106. For example, if the server 140 determines that the user 102 was not satisfied with a response 106 based on an input 104, follow-up input, or otherwise elicited feedback of the user, the server 140 may determine that the response 106 is associated with an anomaly. In response, the server 140 may determine where the anomaly lies and perform countermeasure actions to address or remedy the anomaly.

i. Sequence Correction

In some cases, the anomaly may be due to an incorrect order of utterances 154*a-n* by which their operations 220*a-n* are performed. For example, assume that initially, the sequence of utterances 154*a-n* is not reordered to the correct order so that the requests of the user 102 are addressed. In the example above when the input 104 is "Please send my document 1 to my address. Note that my new address is as below," the utterances 154*a-n* may be reordered so that the address is changed to new address first, then the document 1 is sent to the new address. However, if this reordering does not take place initially, the user 102 may not receive the document 1 at the new address and provide a negative feedback to the server 140. In another example, the response 106 may indicate that it is understood that the document 1 is requested to be send to the address of the user, and then the address needs to be changed to the new address. The response 106 may request the user to confirm the interpretation of the user request. The user 102 may provide a follow-up input/feedback indicating that the interpretation of the user input is not correct and the user actually requested to send the document 1 to the new address. In response, the server 140 may reevaluate the order of utterances 154*a-n*. In this process, the server 140 may perform a sequence correction 234. In this process, the server 140 may detect intents of utterances 154*a-n* and generate a table of all possible orders of each intent compared to other intents of utterances 154*a-n*. For example, the server 140 may generate the Table 1 in which the priority of intent of each utterance 154*a-n* is compared with other priorities of other intents of other utterances 154*a-n*.

TABLE 1

Example possible use cases of order of utterances 154a-n based on priority

|  | Intent 1 | Intent 2 | Intent 3 |
|---|---|---|---|
| Intent 1 | 0 | 2 | 1 |
| Intent 2 | 1 | 0 | 2 |
| Intent 3 | 2 | 1 | 0 |

In Table 1, the first row shows the priority values of intent 1 (associated with the first utterance 154*a*), intent 2 (associated with the second utterance 154*b*), and intent 3 (associated with the third utterance 154*n*) compared to the intent 1. First row shows a use case where the priority of intent 2 (associated with the second utterance 154*b*) is 2 out of 2 and priority of intent 3 (associated with the third utterance 154*c*) is 1 out of 2. In the first row, the priority of the intent 1 is 0 (compared to intent 1), the priority of the intent 2 is 2 (compared to intent 1), and the priority of the intent 3 is 1 (compared to intent 1). Therefore, if the order of priorities in the first row is used, the second utterance 154*b* is prioritized first, the third utterance 154*n* is prioritized second, and the first utterance 154*a* is prioritized third.

The second row shows the priority values of intent 1 (associated with the first utterance 154*a*), intent 2 (associated with the second utterance 154*b*), and intent 3 (associated with the third utterance 154*n*) compared to the intent 2. In the second row, another use case is shown where the priority of the intent 1 is 1 out of 2 (compared to intent 2), the priority of the intent 2 is 0 (compared to intent 2), and the priority of the intent 3 is 2 out of 2 (compared to intent 2). Therefore, if the order of priorities in the second row is used, the third utterance 154*n* is prioritized first, the first utterance 154*a* is prioritized second, and the second utterance 154*b* is prioritized third.

The third row shows the priority values of intent 1 (associated with the first utterance 154*a*), intent 2 (associated with the second utterance 154*b*), and intent 3 (associated with the third utterance 154*n*) compared to the intent 3. In the third row, the priority of the intent 1 is 2 out of 2 (compared to intent 3), the priority of the intent 2 is 1 out of 2 (compared to intent 3), and the priority of the intent 3 is 0 (compared to intent 3). Therefore, if the use case of orders in the third row is used, the first utterance 154*a* is prioritized first, the second utterance 154*b* is prioritized second, and the third utterance 154*n* is prioritized third.

In this manner, the server 140 produces all possible orders of utterances 154*a-n* in different use cases. The server 140 evaluates each of the possible orders of utterances 154*a-n* to determine which order leads to the responses 222*a-n* and operations 220*a-n* satisfying the requests of the user 102 inferred from the input 104. In the example, above when the input 104 is "Please send my document 1 to my address. Note that my new address is as below," the utterances 154*a-n* may be reordered so that the address is changed to the new address first, then the document 1 is sent to the new address.

ii. Conversational Software Algorithm Identification Correction

The server 140 may perform a conversational software algorithm identification correction operation 236. As described above, the server 140 may determine a score 228*a-n* for each conversational software algorithm 150*a-n*. The score 228*a-n* may indicate a confidence level of a respective conversational software algorithm 150*a-n* to be able to process an utterance 154 related to a topic 160 and generate a valid response 222*a-n*. In some cases, a conversational software algorithm 150*a-n* may not be operational, be in service, out of date, or unavailable (collectively referred to herein as associated with an anomaly). In some cases, a conversational software algorithm 150*a-n* may not produce a valid response, similar to that described above. In such cases, the server 140 may identify a fallback or an alternative conversational software algorithm 150*a-n* that have the next highest score 228 to replace (at least temporarily) the initial conversational software algorithm 150*a-n*. The alternative conversational software algorithm 150 may have a next top score 228 to process the utterance 154 and product a valid response 222 compared to the initial conversational software algorithm 150 that was selected to process the utterance 154.

An example table of scores 228 of conversational software algorithms 150a-n to process an utterance 154 is presented below. Table 2. Example scores of conversational software algorithms to process an utterance

TABLE 2

Example ranking of conversational software algorithms based on scores.

| Utterance 154 | Conversational software algorithm | Score 228 |
|---|---|---|
| "find file 1 in my profile" | Conversational software algorithm 150a | 8 |
| "find file 1 in my profile" | Conversational software algorithm 150b | 6 |
| "find file 1 in my profile" | Conversational software algorithm 150n | 2 |

As can be seen in Table 2, the score 228a of the conversational software algorithm 150a to process the utterance "find file 1 in my profile" is 8, the score 228b of the conversational software algorithm 150b to process the utterance "find file 1 in my profile" is 6, and the score 228n of the conversational software algorithm 150n to process the utterance "find file 1 in my profile" is 2. Thus, the conversational software algorithm 150a may initially be selected to process the utterance 154. However, if the conversational software algorithm 150a is associated with anomaly (e.g., not be available or provide an invalid response), the server 140 determines that the conversational software algorithm 150b is a fallback that can process the utterance 154. The server 140 may perform ranking for conversational software algorithms 150a-n for each topic 160. In the example of Table 2, the ranking is shown with respect to an utterance 154 associated with a particular topic 160. In another example table, other rankings of conversational software algorithms 150a-n may be determined for other topics 160 and/or utterances 154. The server 140 may increase a score 228 of a conversational software algorithm 150 if a response 222 of the conversational software algorithm 150 is determined to be invalid with respect to a given utterance 154 with a topic 160. Otherwise, the server 140 may decrease the score 228 of the conversational software algorithm 150.

iii. Utterance Correction

The server 140 may perform an utterance correction operation 238. In some cases, a generated utterance 154 may not be understood by a respective conversational software algorithm 150. For example, an utterance 154 may be "get John." The conversational software algorithm 150 identified to be pre-configured to process the utterance 154 may generate an invalid response 222. In response, the server 140 may generate a new utterance 154, such as "find John's contact information from my contact list." The server 140 may use the new utterance 154 for generating a response 222, similar to that described above.

Method for Generating a Response for a Multi-Intent Input

Figure 3:
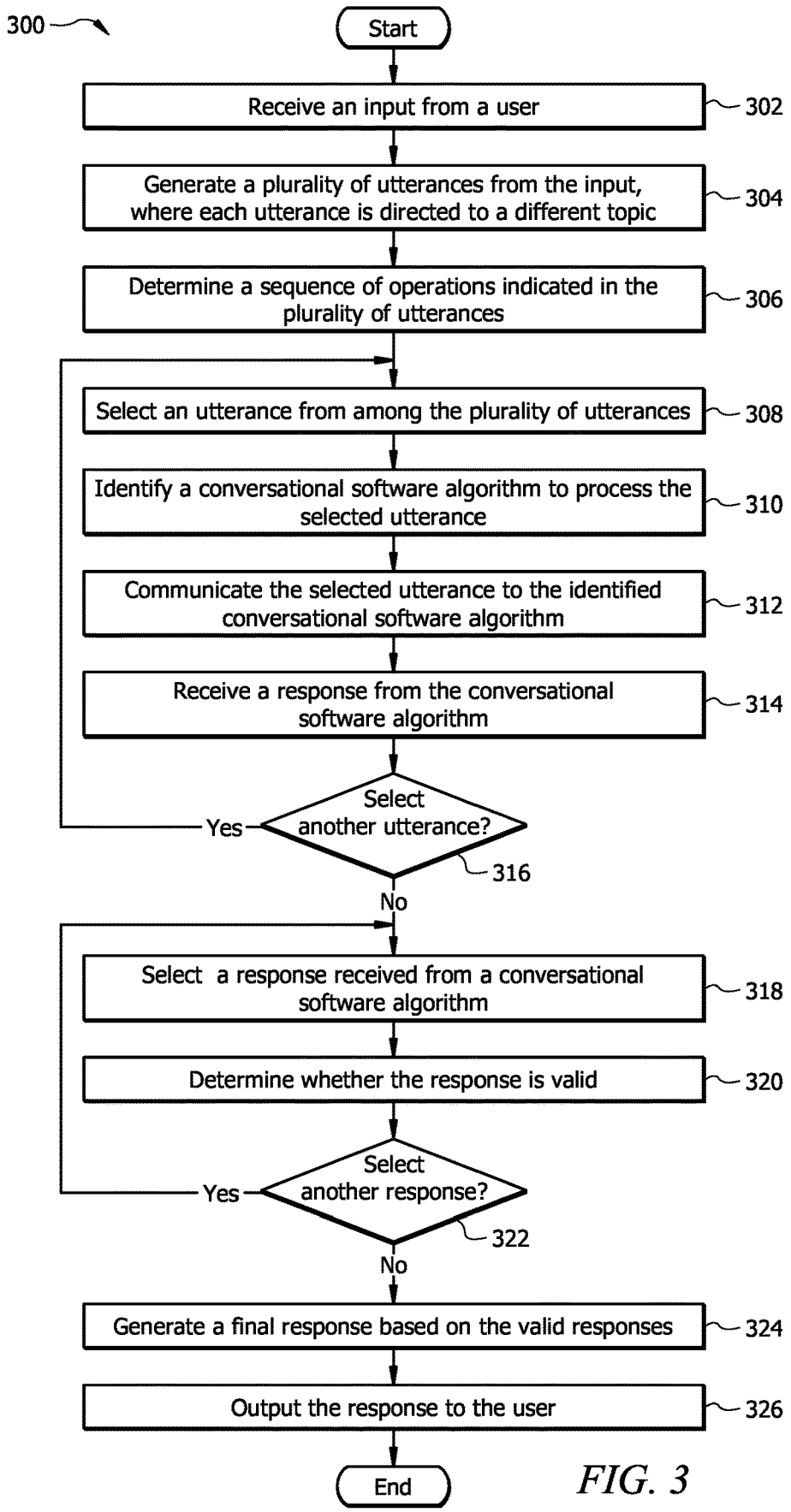
FIG. 3 illustrates an example operational flow of the system of FIG. 1 to generate utterances to convey user input to conversational software algorithms.

FIG. 3 illustrates an example flowchart of a method 300 generating a response for a multi-intent input 104 according to certain embodiments of the present disclosure. Modifications, additions, or omissions may be made to method 300. Method 300 may include more, fewer, or other operations.

For example, operations may be performed in parallel or in any suitable order. While at times discussed as the system 100, server 140, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-326.

At operation 302, the server 140 receives an input 104 from the user 102. For example, the server 140 may receive the input 104 when the user 102 provides the input 104 to the computing device 120 and the computing device 120 sends the input 104 to the server 140.

At operation 304, the server 140 generates a plurality of utterances 154a-n from the input 104, where each utterance 154a-n is directed to a different topic 160. For example, the server 140 generates the utterances 154a-n by implementing the utterance builder 162, similar to that described in FIGS. 2 and 4.

At operation 306, the server 140 determines a sequence of operations 220a-n indicated in the plurality of utterances 154a-n. For example, the server 140 determines the sequence of operations 220a-n based on the sequence of operations of utterances associated with a corresponding historical conversation 138, the workflow 428, intent hierarchy 430, log file 432, the graph embedding 434, and intent entity embedding 414, similar to that described in FIGS. 2 and 4.

At operation 308, the server 140 selects an utterance 154 from among the utterances 154a-n. The server 140 iteratively selects an utterance 154 until no utterance 154 is left for evaluation. At operation 310, the server 140 identifies a conversational software algorithm 150a-n to process the selected utterance 154a-n. For example, the server 140 may identify the conversational software algorithm 150a-n that is associated with the topic 160 of the selected utterance based on the table 158, similar to that described in FIG. 2.

At operation 312, the server 140 communicates the selected utterance 154 to the identified conversational software algorithm 150. At operation 314, the server 140 receives a response 222 from the conversational software algorithm 150.

At operation 316, the server 140 determines whether to select another utterance 154. The server 140 determines to select another utterance 154 if at least one utterance 154 is left for evaluation. If it is determined another utterance 154 is left for evaluation, method 300 returns to operation 308. Otherwise, method 300 proceeds to operation 318.

At operation 318, the server 140 selects a response 222 received from a conversational software algorithm 150. The server 140 iteratively selects a response 222 until no response 222 is left for evaluation.

At operation 320, the server 140 determines whether the response 222 is valid. In this process, the server 140 may compare the response 222 with each of the reference responses 226 and determine whether the response 222 corresponds to any of the reference responses 226. The reference responses 226 may be expected responses related to the topic of the respective utterance 154 for which the response 222 is generated. If it is determined that the response 222 is valid, the response 222 is used in the final response 106. Otherwise, the response 222 may not be used in the final response 106.

At operation 322, the server 140 determines whether to select another response 222. The server 140 determines to select another response 222 if at least one response 222 is left for evaluation. If it is determined that at least one response 222 is left for evaluation, the method 300 returns to operation 318. Otherwise, the method 300 proceeds to operation 324. At operation 324, the server 140 generates a final response 106 based on the valid responses, similar to that described in FIG. 2. At operation 326, the server 140 outputs the response 106 to the user 102, e.g., displays the response 106 on the conversational interface 152 and/or plays an audio that utters the response 106 via the conversational interface 152.

Figure 4:
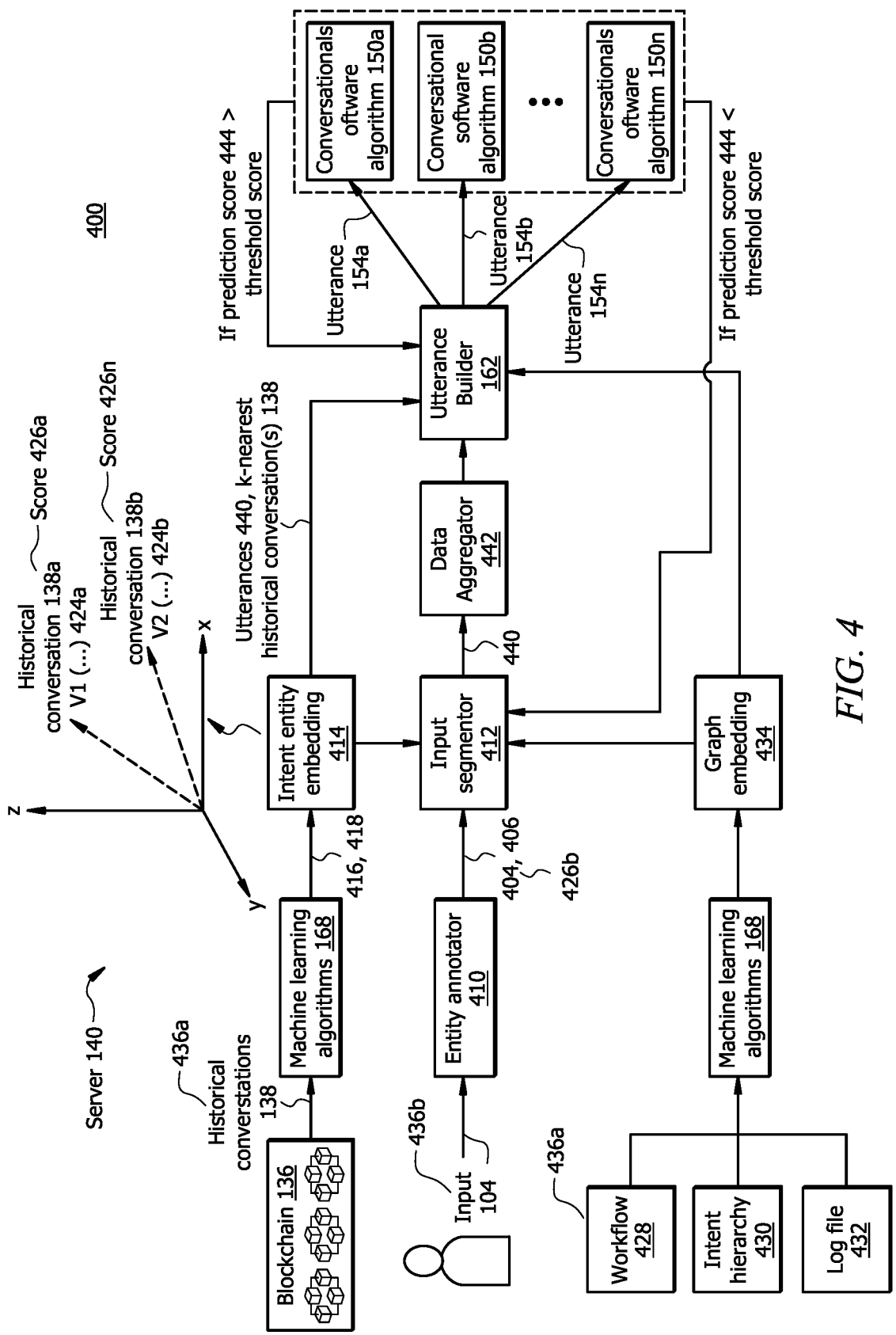
FIG. 4 illustrates an example flowchart of a method to generate utterances to convey user input to conversational software algorithms.

Example Operational Flow for Utterance Building to Covey User Input to Conversational Software Algorithms FIG. 4 illustrates an example operational flow 400 of system 100 (see FIG. 1) for building utterances 154 to convey user input 104 to conversational software algorithms 150. In operation, the server 140 may initiate the operational flow 400 when the input 104 is received at the server 140, e.g., via the computing device 120, similar to that described in FIG. 1. The input 104 is fed to an entity annotator 410.

The entity annotator 410 may be implemented by the processor 142 (see FIG. 1) executing software instructions 148 (see FIG. 1) and is generally configured to annotate and identify the entities 406 from the input 104. In certain embodiments, the entity annotator 410 may include a support vector machine, neural network, random forest, k-means clustering. Tree-based algorithm, Random Forest algorithm, etc. In certain embodiments, the entity annotator 410 may include natural language processing, audio signal processing, and the like. In certain embodiments, the entity annotator 410 may perform word segmentation, sentence segmentation, word tokenization, sentence tokenization, sentiment analysis, and/or the like in processing input 104 to detect the words, the location of each word with respect other words in a sentence (e.g., a portion of input 104), sentiment, meaning, context, topic, intent, and other information about each portion of input 104. The entities 406 may include any data object, such as a name of a request initiator (e.g., user), a name of a receiver, an object, a file, a number, an action, a verb, a noun, an adjective, and the like. The entity annotator 410 may also detect intents 404 in the input 104. The entities 406 and intents 404 are fed to the input segmentor 412.

As described in FIG. 1, the historical conversations 138 are stored in the blockchain 136. The server 140 fetches the historical conversations 138 from the blockchain 136. The server 140 feeds the historical conversations 138 to a machine learning algorithm 168. The machine learning algorithm 168 may be implemented by the processor 142 (see FIG. 1) executing software instructions 148 (see FIG. 1) and is generally configured to extract the intents 418 and entities 416 from each historical conversation 138 and determine a vector 424 that represents a respective historical conversation 138 in a vector space 420. Each historical conversation 138 may include one or more intents 418. Each intent 418 may be associated with one or more entities 416. The entities 416 may include any data object, such as a name of a request initiator (e.g., user), a name of a receiver, an object, a file, a number, a task, an action, a verb, a noun, an adjective, and the like. The intents 418 may include any intent of a user as indicated in a given historical conversation 138, such as transferring a file, fetching data, changing a name, changing an address, etc. The output of the machine learning algorithm 168 may be the intent entity embedding 414. The intent entity embedding 414 may correspond to vectors 424*a-b* that represent the historical conversations 138.

The server 140 may extract the intents 418 and entities 416 from the historical conversations 138. The entities 416 may include a task, a data object associated with a task, etc. The server 140 may generate the intent entity embedding 414 by implementing a machine learning algorithm 168, such as natural language processing, audio processing, and the like. In this process, the server 140 may feed each historical conversation 138 to the machine learning algorithm 168. The machine learning algorithm 168 may extract the meaning, context, words, sentiment, and other information about the received historical conversation 138. The server 140 (e.g., via the machine learning algorithm 168) may perform word segmentation, sentence segmentation, word tokenization, sentence tokenization, sentiment analysis, and/or the like on the historical conversation 138. The server 140 may determine a score 426 for a given historical conversation 138, where the score 426 may represent the location of the given historical conversation 138 in the vector space 420.

The server 140 may determine the vector 424*a* that represents the first historical conversation 138. The server 140 may determine the score 426*a* that represents the location of the first historical conversation 138*a* in the vector space 420. Similarly, the server 140 may determine the vector 424*b* that represents the second historical conversation 138*b* and determine the score 426*b* that represents the location of the second historical conversation 138*b* in the vector space 420. The intent entity embedding 414 may be fed to the input segmentor 412.

Determining the Sequence of Utterances

The server 140 may access workflows 428. Each workflow 428 may be associated with a different operation 220*a-n* (see FIG. 2). For example if an operation 220*a-n* is to transfer a file to a recipient, the workflow 428 may include operations to fetch the file from a memory, fetch the contact information of the recipient, and transfer the file to the recipient. Similarly, other operations may have respective workflows 428. These workflows 428 may be used for determining the order of utterances 154 and operations 220*a-n* (see FIG. 2) to be performed in order to satisfy the requests indicated in the input 104.

The server 140 may access the intent hierarchy 430. The intent hierarchy 430 may indicate a relationship between a parent intent 404, 418 and the child intents 404, 418. A child intent 404, 418 may be a subcategory of the respective parent intent 404. In other words, a child intent 404, 418 may be a genus, and the respective parent intent 404, 418 may be a species. The server 140 may determine, based on the entity annotator 410, the intent hierarchy 430 and intent entity embedding 414, the intents 404 indicated in the input 104. The server 140 may determine the parent and child intents 418 based on the intent hierarchy 430. The server 140 may determine the order of parent and child intents 404 in the input 104. If it is determined that a child intent 404 is recited or indicated before the parent intent 404 in the input 104, the server 140 may use this information to reorder the utterances 154 so that an utterance 154 in which the parent intent 404 is indicated is processed, placed, recited, or its operation is performed before an utterance 154 in which the child intent 404 is indicated.

The server 140 may access the log files 432. The log files 432 may include a record of software applications used to perform a given task and the order by which the software applications are called/used to perform the given task. The tasks may be requested by the user 102 in the input 104. The server 140 may use the log file 432 to determine the sequence of the utterances 154 and operations 220*a-n* (see FIG. 2). For example, assuming that a task A is indicated in the input 104, the operations 220*a-n* (see FIG. 2) may be ordered/sequenced to be performed based on the order of the software applications used to perform the task A.

The server 140 feeds the workflows 428, intent hierarchy 430, and the log files 432 to the machine learning algorithm 168. The machine learning algorithm 168 may further be configured to analyze the workflow 428, intent hierarchy 430, and log file 432. The machine learning algorithm 168 extracts a set of features from the input, where the set of features include meaning, context, words, sentences, order of sentences, and other information about the input. The machine learning algorithm 168 generates a graph embedding 434 that represents the extracted set of features. The graph embedding 434 may be the output of the machine learning algorithm 168 and generally represents the features of workflows 428, intent hierarchy 430, and the log files 432. The graph embedding 434 may be represented in a vector format. The graph embedding 434 may be fed to the input segmentor 412.

Splitting the Input into Logical Portions

The input segmentor 412 may be implemented by the processor 142 (see FIG. 1) executing software instructions 148 (see FIG. 1) and is generally configured to split the input 104 into logical portions, where each portion is directed to a single topic 160, intent 404, or request, similar to that described in FIG. 2. In this process, the input segmentor 412 uses the intent entity embedding 414, the entities 406 and intents 404 extracted from the input 104, and graph embedding 434 to split the input 104 into the logical portions.

For example, assume that a historical conversation 138 indicates a first task 436*a*, one of the workflows 428 indicates the first task 436*a*, and the input 104 indicates a request to perform a second task 436*b*. The historical conversation 138 is previously split into a first set of utterances 154, where each of the first set of utterances is directed to a different operation 220 compared to other utterances 154 from among the first set of utterances 154, similar to that described in FIG. 2. The server 140 extracts a first set of entities 416 and intents 418 from the historical conversation 138, where the first set of entities 416 may include the first task 436*a* and a first data object associated with the first task 436*a*.

The server 140 generates the intent entity embedding 414 based on the historical conversation 138, similar to that described above. The server 140 determines the score 426 of the historical conversation 138 in the vector space 420. The server 140 extracts a second set of entities 406 and intents 404 by implementing the entity annotator 410 from the input 104. The second set of entities 406 may include the second task 436*b* and a second data object associated with the second task 436*b*. The intents 404 may include fetching contact information, communicating a data, a file, and the like to a particular user, and the like. The server 140 feeds the intent entity embedding 414, the entities 406, intents 404, the graph embedding 434 to the input segmentor 412.

The input segmentor 412 determines a score 426*b* for the input 104 based on the received information. The score 426*b* may indicate the location of the input 104 in the vector space 420. To this end, the server 140 (e.g., via the input segmentor 412) compares each entity 406 from among the second set of entities 406 with a counterpart entity 416 from among the first set of entities 416. The server 140 (e.g., via the input segmentor 412) determines whether at least a threshold percentage of the entities 406 corresponds to (or matches) the counterpart entity 416. The threshold percentage may be 70%, 80%, 90%, etc., for example. If it is determined that at least the threshold percentage of the entities 406 corresponds to (or matches) the counterpart entity 416, the server 140 may determine that the score 426*b* is within a threshold range from the score 426*a* of the historical conversation 138. The threshold range maybe 0.01, 0.02, and the like. In some embodiments, if it is determined that at least the threshold percentage of the entities 406 corresponds to (or match) the counterpart entity 416, the server 140 may determine that the input 104 includes intents 404 that correspond to the intents 418, and vice versa.

The server 140 may perform a similar operation with respect to intents 418, 408. In this operation, the server (e.g., via input segmentor 412) may compare each intent 404 with a counterpart intent 418. If it is determined that at least a threshold percentage (e.g., 70%, 80%, 90%, etc.) of the intents 404 corresponds to (or matches) the counterpart intents 418, the server 140 may determine that the score 426*b* is within the threshold range of the score 426*a* of the historical conversation 138. In response, the server 140 (e.g., via the input segmentor 412) may determine a corresponding historical conversation 138 for the input 104. Further in response, the server 140 (e.g., via the input segmentor 412) may determine that the input 104 can be split into similar (or same) logical portions as the corresponding historical conversation 138.

The server (e.g., via the input segmentor 412) may determine that the sequence of the operations that need to be performed for the split logical portions of the input 104 may follow, match, or correspond to the order of the operations used to perform the task 436*a* associated with the historical conversation 138 and workflow 428. Additionally or alternatively, the server 140 may determine that the sequence of the operations that need to be performed for the split logical portions of the input 104 may follow, match, or correspond to the order by which the software applications were called/used to perform the task 436*a* as indicated in the log file 432. Additionally or alternatively, the server 140 may determine that the sequence of the operations that need to be performed for the split logical portions of the input 104 may follow, match, or correspond to the order of parent and child intents indicated in the intent hierarchy 430, similar to that described above.

In certain embodiments, the server 140 (e.g., via the input segmentor 412) may use the graph embedding 434 to determine the sequence of the split logical portions of the input 104, where the graph embedding 434 indicates the order of the operations used to perform the task 436*a* associated with the workflow 428, the order by which the software applications were called/used to perform the task 436*a* as indicated in the log file 432, and the order of parent and child intents indicated in the intent hierarchy 430. In response, the server 140 (e.g., the input segmentor 412) may split the input 104 into a second set of utterances 440 according to the first set of utterances associated with the corresponding historical conversation 138. For example, assuming that the input 104 is "send a file 1 from my profile to John," the set of utterances 440 may include "send a file 1," "from my profile," and "to John." Each of the second set of utterances 440 may be associated with a different topic, request, or intent 404. The server 140 may communicate the second set of utterances 440 to a data aggregator 442.

Identifying Historical Conversations Corresponding to the Input

The data aggregator 442 may be implemented by the processor 142 (see FIG. 1) executing software instructions 148 (see FIG. 1) and is generally configured to aggregate the input received from the input segmentor 412 and determine that whether the score 426b of the input 104 corresponds to the score 426a of the historical conversation 138a. The server 140 (e.g., via the data aggregator 442) may determine that the score 426b of the input 104 corresponds to the score 426a of the historical conversation 138 if the score 426b is within a threshold distance from the score 426a (e.g, within 0.01, 0.02 range, etc.) in the vector space 420. The server 140 (e.g., via the data aggregator 442) may determine to which class of historical conversations 138, the input 104 belongs. The server 140 may determine that the input 104 belongs to a group/class of historical conversations 138 that are the k-nearest neighbors of the input 104 based on their scores 426a-n in the vector space 420, where k is a number of closest historical conversations 138 to the vector 424 representing the input 104 in the vector space 420. In response, the server 140 (e.g., via the data aggregator 442) identifies the corresponding historical conversation(s) 138 to the input 104. The server 140 feeds this information to the utterance builder 162.

Aspects of the utterance builder 162 are described in FIG. 2, additional aspects are described below. The utterance builder 162 receives the intent entity embedding 414, output of the data aggregator 442, and graph embedding 434. The utterance builder 162 generates a third set of utterances 154a-n, where each utterance 154a-n explains or is a more comprehensive explanation of a responsive utterance 440. Each utterance 154a-n indicates a different operation compared to other utterances 154a-n. The utterances 154a-n are generated by a neural network that is configured to generate utterances 154a-n from the provided input so that each utterance 154a-n is an explanation of a respective utterance 440 and that a respective conversational software algorithm 150a-n is associated with a topic 160 of the respective utterance 154a-n based on the table 158, similar to that described in FIG. 1. The operations (220a-n in FIG. 2) indicated by the utterances 154a-n are to be performed in order to perform the task(s) 436b.

The server 140 (e.g., via the utterance builder 162) may determine the sequence of the operations (220a-n in FIG. 2) based on the determined order of the operations of the task 436a determined from the historical conversation 138, intent entity embedding 414, workflow 428, and log file 432, intent hierarchy 430, and graph embedding 434. The server 140 (e.g., via the utterance builder 162 and conversation orchestrator 156 (see FIG. 2)) may forward each utterance 154a-n to the respective conversational software algorithm 150a-n, similar to that described in FIGS. 1 and 2. The server 140 may perform the operations 220a-n (see FIG. 2) according to the determined sequence.

In some embodiments, the server 140 may receive feedback from each conversational software algorithm 150a-n, where the feedback indicates a prediction score 444 that indicates if a respective conversational software algorithm 150a-n predicted the topic 160 of the input utterance 154a-n correctly, e.g., if the prediction of the conversational software algorithm 150a-n regarding the topic of the utterance corresponds to or matches the actual topic 160 of the utterance. For example, the prediction score 444 may be a percentage value that indicates the similarity between the topic of the input utterance 154a-n predicted by the conversational software algorithm 154a-n and the topic 160. If the server 140 determines that the prediction score 444 is more than a threshold percentage (e.g., more than 80%, 90%, etc.), the server 140 determines that the conversational software algorithm 150a-n is selected, assigned, or identified correctly to process the respective utterance 154a-n. This information may be fed back to the utterance builder 162 as a positive feedback to further improve the accuracy of the conversational software algorithm 150a-n identification, selection, or assignment. Otherwise, the feedback may be sent to the input segmentor 412 to regenerate the utterance 440 associated with and that leads to a low prediction score 444 less than the threshold. The feedback sent to the input segmentor 412 may be used as negative feedback to the input segmentor 412 and/or utterance builder 162 to update the bias and weight values of their neural networks in back propagation operation. For example, assume that the utterance 154a indicates a first topic 160a. In response, the server 140 communicates the utterance 154a to the first conversational software algorithm 150a. The server 140 receives the response from the first conversational software algorithm 150a, where the first response indicates a prediction of the first conversational software algorithm 150a regarding a topic of the utterance 154a. The server 140 determines whether the prediction 444 of the first conversational software algorithm 150a corresponds to the first topic 160a. In response to determining that the prediction 444 of the first conversational software algorithm 150a corresponds to the first topic 160a, the server 140 associates the first conversational software algorithm 150a to the first topic 160a. The server 140 may add the first conversational software algorithm 150a to the table 158 and indicate that the first conversational software algorithm 150a is associated with the first topic 160a.

The server may assign a weight value (i.e., prediction score 444) to the first conversational software algorithm 150a, where the weight value indicates the accuracy of the first conversational software algorithm 150a in processing the utterances 154 in which the first topic 160a is indicated. In some embodiments, in response to determining that the prediction of the first conversational software algorithm 150a does not correspond to the first topic 160a, the server 140 may identify another conversational software algorithm 150a that is previously associated with the first topic 160a. The server 140 may communicate the first utterance 154a to the identified conversational software algorithm 150a.

Figure 5:
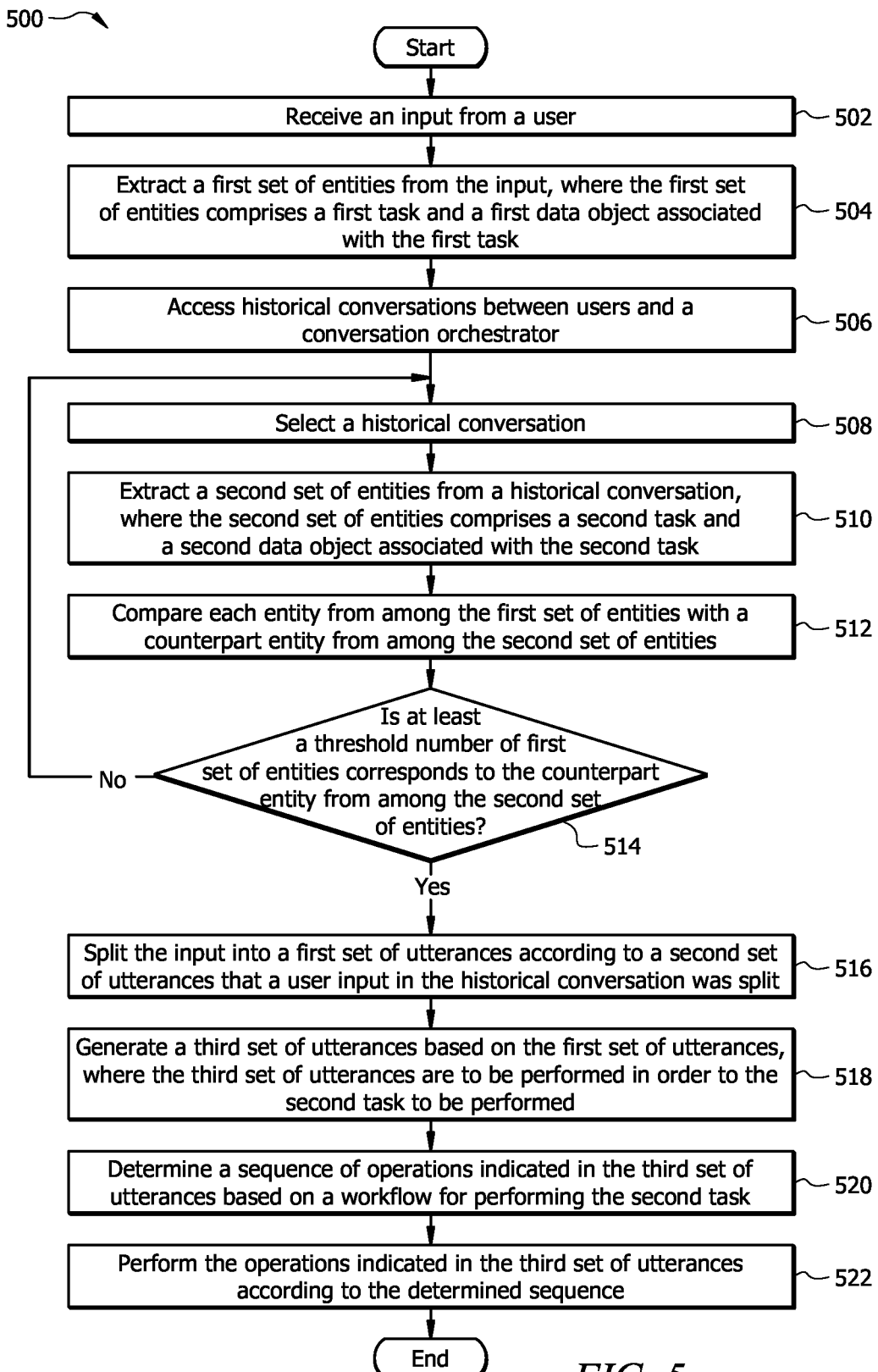
FIG. 5 illustrates an example flowchart of a method to generate dynamic responses based on an anomaly associated with a software application.

Method for Utterance Building to Covey User Input to Conversational Software Algorithms FIG. 5 illustrates an example flowchart of a method 500 for utterance building to covey user input to conversational software algorithms according to certain embodiments of the present disclosure. Modifications, additions, or omissions may be made to method 500. Method 500 may include more, fewer, or other operations. For example, operations may be performed in parallel or in any suitable order. While at times discussed as the system 100, server 140, or components of any of thereof performing operations, any suitable system or components of the system may perform one or more operations of the method 500. For example, one or more operations of method 500 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 502-522.

At operation 502, the server 140 receives an input 104 from a user 102, similar to that described in operation 302 and FIG. 2. At operation 504, the server 140 extracts a first set of entities 406 from the input 104, where the first set of entities 406 comprises a first task 436b and a first data object associated with the first task 436b. In this process, the server 140 may feed the input 104 to the entity annotator 410 and extract the entities 406 and intents 404, similar to that described in FIG. 4.

At operation 506, the server 140 accesses historical conversations 138 between users and the conversational orchestrator 156. At operation 508, the server 140 selects a historical conversation 138. The server 140 may iteratively select a historical conversation 138 until no historical conversation is left for evaluation.

At operation 510, the server 140 extracts a second set of entities 416 from the historical conversation 138, where the second set of entities 416 comprises a second task 436a and a data object associated with the second task 436a. For example, the server 140 may extract the entities 416 and intents 418 via the machine learning algorithm 168, similar to that described in FIG. 4.

At operation 512, the server 140 compares each entity 406 from among the first set of entities 406 with a counterpart entity 416 from among the second set of entities 416. For example, the server 140 may compare each entity 406 with a counterpart entity 416 via the input segmentor 412, data aggregator 442, and/or utterance builder 162, similar to that described in FIG. 4.

At operation 514, the server 140 determines whether at least a threshold number of first set of entities 406 correspond to counterpart entities 416 from among the second set of entities 416. If it is determined that at least a threshold number (e.g., 80%, etc.) of first set of entities 406 correspond to counterpart entities 416 from among the second set of entities 416, method 500 may proceed to operation 516. Otherwise, the method 500 may return to operation 508. At operation 516, the server 140 splits the input 104 into a first set of utterances 440 according to a second set of utterances that the user input in the historical conversation 138 was split. For example, the server 140 may split the input 104 via the input segmentor 412, similar to that described in FIG. 4.

At operation 518, the server 140 generates a third set of utterances 154a-n based on the first set of utterances 440, where the third set of utterances 154a-n are to be performed in order to the second task 436b to be performed. For example, the server 140 generates the third set of utterances 154a-n via the utterance builder 162, similar to that described in FIGS. 2 and 4.

At operation 520, the server 140 determines a sequence of operations 220a-n indicated in the third set of utterances 154a-n based on the workflow 428 for performing the second task 436b. The sequence of operations 220a-n may be further based on the intent hierarchy 430, log file 432, graph embedding 434, and intent entity embedding 414, similar to that described in FIG. 4. At operation 522, the server 140 performs the operations 220a-n indicated in the third set of utterances 154a-n according to the determined sequence.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for generating a response from a multi-topic input, comprising:
   a memory configured to store a table of conversational software algorithms and a plurality of topics, wherein the table comprises:
   a first entry that indicates that a first conversational software algorithm is associated with a first topic; and
   a second entry that indicates that a second conversational software algorithm is associated with a second topic; and
   a processor, operably coupled to the memory, and configured to:
   receive an input from a user, wherein the input indicates a request to perform one or more tasks;
   extract a first set of features from the input, wherein the first set of features represents at least a sentiment of the input or a position of each word within the input;
   generate a first vector that represents the extracted first set of features in a vector space;
   access a training dataset that comprises a set of vectors, wherein each vector from among the set of vectors is associated with a given historical conversation;
   compare the first vector with a second vector from the training dataset by determine a distance between the first vector and the second vector in the vector space;
   determine that the distance is less than a threshold distance;
   in response to determining that the distance is less than the threshold distance:
   split the input into a plurality of utterances according to historical utterances associated with the second vector, wherein:
   the plurality of utterances comprises a first utterance and a second utterance;
   the first utterance indicates a first operation;
   the second utterance indicates a second operation;
   the first operation and the second operation are to be performed in order to perform the one or more tasks; and
   determine a sequence of the first operation and the second operation to be performed in order to perform the one or more tasks;
   identify, based at least in part upon the table, the first conversational software algorithm that is associated with the first utterance, wherein the first conversational software algorithm is configured to process the first utterance;
   identify, based at least in part upon the table, the second conversational software algorithm that is associated with the second utterance, wherein the second conversational software algorithm is configured to process the second utterance;
communicate the first utterance to the first conversational software algorithm;
receive a first response from the first conversational software algorithm in response to communicating the first utterance to the first conversational software algorithm;
communicate the second utterance to the second conversational software algorithm;
receive a second response from the second conversational software algorithm in response to communicating the second utterance to the second conversational software algorithm;
determine whether each of the first response and the second response is valid; and
in response to determining that each of the first response and the second response is valid:
generate a final response based at least in part upon the first response and the second response; and
output the final response to the user.

2. The system of claim 1, wherein the processor is further configured to:
in response to determining that the first response is invalid:
identify a third conversational software algorithm that is a fallback for the first conversational software algorithm;
communicate the first utterance to the third conversational software algorithm;
receive a third response from the third conversational software algorithm in response to communicating the first utterance to the third conversational software algorithm;
form the final response based at least in part upon the second response and the third response; and
output the final response to the user.

3. The system of claim 2, wherein the first response is determined to be invalid if the first response does not correspond to any of reference responses associated with the first topic.

4. The system of claim 1, wherein the processor is further configured to:
determine whether the first response requires a follow-up input from the user; and
in response to determining that the first response requires the follow-up input from the user:
prioritize the first response over the second response such that the first response is presented prior to the second response in the final response;
receive the follow-up input from the user;
generate a third utterance from the follow-up input, wherein the third utterance indicates a third action;
determine a third context of the third utterance;
identify a fourth conversational software algorithm that is associated with the third utterance based at least in part upon the third context of the third utterance and the table, wherein the table further comprises a third entry that indicates that the fourth conversational software algorithm is associated with a third topic, wherein the third context is associated with the third topic;
communicate the third utterance to the fourth conversational software algorithm;
receive a fourth response from the fourth conversational software algorithm in response to communicating the third utterance to the fourth conversational software algorithm;
determine that the fourth response is valid;
generate a second final response based at least in part upon the fourth response; and
output the second final response to the user.

5. The system of claim 1, wherein the first operation and the second operation are performed in an order of the determined sequence of the first operation and the second operation.

6. The system of claim 1, wherein:
identifying the first conversational software algorithm that is associated with the first utterance comprises:
determine a first context of the first utterance;
determine that the first context of the first utterance is related to the first topic; and
determine that the first conversational software algorithm is associated with the first utterance in response to determining that the first context of the first utterance and the first conversational software algorithm are associated with the first topic based at least in part upon the table; and
identifying the second conversational software algorithm that is associated with the second utterance comprises:
determine a second context of the second utterance;
determine that the second context of the first utterance is related to the second topic; and
determine that the second conversational software algorithm is associated with the second utterance in response to determining that the second context of the second utterance and the second conversational software algorithm are associated with the second topic based at least in part upon the table.

7. The system of claim 1, wherein the plurality of utterances is implicitly implied in the input.

8. A method for generating a response from a multi-topic input, comprising:
storing a table of conversational software algorithms and a plurality of topics, wherein the table comprises:
a first entry that indicates that a first conversational software algorithm is associated with a first topic; and
a second entry that indicates that a second conversational software algorithm is associated with a second topic;
receiving an input from a user, wherein the input indicates a request to perform one or more tasks;
extracting a first set of features from the input, wherein the first set of features represents at least a sentiment of the input or a position of each word within the input;
generating a first vector that represents the extracted first set of features in a vector space;
accessing a training dataset that comprises a set of vectors, wherein each vector from among the set of vectors is associated with a given historical conversation;
comparing the first vector with a second vector from the training dataset by determining a distance between the first vector and the second vector in the vector space;
determining that the distance is less than a threshold distance;
in response to determining that the distance is less than the threshold distance:
splitting the input into a plurality of utterances according to historical utterances associated with the second vector, wherein:

the plurality of utterances comprises a first utterance and a second utterance;
the first utterance indicates a first operation;
the second utterance indicates a second operation;
the first operation and the second operation are to be performed in order to perform the one or more tasks; and
determining a sequence of the first operation and the second operation to be performed in order to perform the one or more tasks;
identifying, based at least in part upon the table, the first conversational software algorithm that is associated with the first utterance, wherein the first conversational software algorithm is configured to process the first utterance;
identifying, based at least in part upon the table, the second conversational software algorithm that is associated with the second utterance, wherein the second conversational software algorithm is configured to process the second utterance;
communicating the first utterance to the first conversational software algorithm;
receive a first response from the first conversational software algorithm in response to communicating the first utterance to the first conversational software algorithm;
communicating the second utterance to the second conversational software algorithm;
receive a second response from the second conversational software algorithm in response to communicating the second utterance to the second conversational software algorithm;
determining whether each of the first response and the second response is valid; and
in response to determining that each of the first response and the second response is valid:
generating a final response based at least in part upon the first response and the second response; and
outputting the final response to the user.

9. The method of claim 8, further comprising:
in response to determining that the first response is invalid:
identifying a third conversational software algorithm that is a fallback for the first conversational software algorithm;
communicating the first utterance to the third conversational software algorithm;
receiving a third response from the third conversational software algorithm in response to communicating the first utterance to the third conversational software algorithm;
forming the final response based at least in part upon the second response and the third response; and
outputting the final response to the user.

10. The method of claim 9, wherein the first response is determined to be invalid if the first response does not correspond to any of reference responses associated with the first topic.

11. The method of claim 8, further comprising:
determining whether the first response requires a follow-up input from the user; and
in response to determining that the first response requires the follow-up input from the user:
prioritizing the first response over the second response such that the first response is presented prior to the second response in the final response;
receiving the follow-up input from the user;
generating a third utterance from the follow-up input, wherein the third utterance indicates a third action;
determining a third context of the third utterance;
identifying a fourth conversational software algorithm that is associated with the third utterance based at least in part upon the third context of the third utterance and the table, wherein the table further comprises a third entry that indicates that the fourth conversational software algorithm is associated with a third topic, wherein the third context is associated with the third topic;
communicating the third utterance to the fourth conversational software algorithm;
receiving a fourth response from the fourth conversational software algorithm in response to communicating the third utterance to the fourth conversational software algorithm;
determining that the fourth response is valid;
generating a second final response based at least in part upon the fourth response; and
outputting the second final response to the user.

12. The method of claim 8, wherein the first operation and the second operation are performed in an order of the determined sequence of the first operation and the second operation.

13. The method of claim 8, wherein:
identifying the first conversational software algorithm that is associated with the first utterance comprises:
determining a first context of the first utterance;
determining that the first context of the first utterance is related to the first topic; and
determining that the first conversational software algorithm is associated with the first utterance in response to determining that the first context of the first utterance and the first conversational software algorithm are associated with the first topic based at least in part upon the table; and
identifying the second conversational software algorithm that is associated with the second utterance comprises:
determining a second context of the second utterance;
determining that the second context of the first utterance is related to the second topic; and
determining that the second conversational software algorithm is associated with the second utterance in response to determining that the second context of the second utterance and the second conversational software algorithm are associated with the second topic based at least in part upon the table.

14. The method of claim 8, wherein the plurality of utterances is implicitly implied in the input.

15. A non-transitory computer-readable medium storing instructions that, when executed by a processor, cause the processor to:
store a table of conversational software algorithms and a plurality of topics, wherein the table comprises:
a first entry that indicates that a first conversational software algorithm is associated with a first topic; and
a second entry that indicates that a second conversational software algorithm is associated with a second topic;
receive an input from a user, wherein the input indicates a request to perform one or more tasks;
extract a first set of features from the input, wherein the first set of features represents at least a sentiment of the input or a position of each word within the input;

generate a first vector that represents the extracted first set of features in a vector space;
access a training dataset that comprises a set of vectors, wherein each vector from among the set of vectors is associated with a given historical conversation;
compare the first vector with a second vector from the training dataset by determine a distance between the first vector and the second vector in the vector space;
determine that the distance is less than a threshold distance;
in response to determining that the distance is less than the threshold distance:
split the input into a plurality of utterances according to historical utterances associated with the second vector, wherein:
the plurality of utterances comprises a first utterance and a second utterance;
the first utterance indicates a first operation;
the second utterance indicates a second operation;
the first operation and the second operation are to be performed in order to perform the one or more tasks; and
determine a sequence of the first operation and the second operation to be performed in order to perform the one or more tasks;
identify, based at least in part upon the table, the first conversational software algorithm that is associated with the first utterance, wherein the first conversational software algorithm is configured to process the first utterance;
identify, based at least in part upon the table, the second conversational software algorithm that is associated with the second utterance, wherein the second conversational software algorithm is configured to process the second utterance;
communicate the first utterance to the first conversational software algorithm;
receive a first response from the first conversational software algorithm in response to communicating the first utterance to the first conversational software algorithm;
communicate the second utterance to the second conversational software algorithm;
receive a second response from the second conversational software algorithm in response to communicating the second utterance to the second conversational software algorithm;
determine whether each of the first response and the second response is valid; and
in response to determining that each of the first response and the second response is valid:
generate a final response based at least in part upon the first response and the second response; and
output the final response to the user.

16. The non-transitory computer-readable medium of claim 15, wherein the instructions further cause the processor to:
in response to determining that the first response is invalid:
identify a third conversational software algorithm that is a fallback for the first conversational software algorithm;
communicate the first utterance to the third conversational software algorithm;
receive a third response from the third conversational software algorithm in response to communicating the first utterance to the third conversational software algorithm;
form the final response based at least in part upon the second response and the third response; and
output the final response to the user.

17. The non-transitory computer-readable medium of claim 16, wherein the first response is determined to be invalid if the first response does not correspond to any of reference responses associated with the first topic.

18. The non-transitory computer-readable medium of claim 15, wherein the instructions further cause the processor to:
determine whether the first response requires a follow-up input from the user; and
in response to determining that the first response requires the follow-up input from the user:
prioritize the first response over the second response such that the first response is presented prior to the second response in the final response;
receive the follow-up input from the user;
generate a third utterance from the follow-up input, wherein the third utterance indicates a third action;
determine a third context of the third utterance;
identify a fourth conversational software algorithm that is associated with the third utterance based at least in part upon the third context of the third utterance and the table, wherein the table further comprises a third entry that indicates that the fourth conversational software algorithm is associated with a third topic, wherein the third context is associated with the third topic;
communicate the third utterance to the fourth conversational software algorithm;
receive a fourth response from the fourth conversational software algorithm in response to communicating the third utterance to the fourth conversational software algorithm;
determine that the fourth response is valid;
generate a second final response based at least in part upon the fourth response; and
output the second final response to the user.

19. The non-transitory computer-readable medium of claim 15, wherein the first operation and the second operation are performed in an order of the determined sequence of the first operation and the second operation.

20. The non-transitory computer-readable medium of claim 15, wherein determining that the first response is valid is in response to:
accessing a set of reference responses associated with the first topic;
comparing the first response with a reference response from among the set of reference responses; and
determining that the first response corresponds to the reference response.

* * * * *